(12) United States Patent
Sun et al.

(10) Patent No.: US 9,640,215 B2
(45) Date of Patent: May 2, 2017

(54) HOLOGRAPHIC LIGHT-EMITTING MODULE AND HOLOGRAPHIC STORAGE SYSTEM USING THE SAME

(71) Applicant: National Central University, Taoyuan (TW)

(72) Inventors: Ching-Cherng Sun, Taoyuan (TW); Yeh-Wei Yu, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 15/014,027

(22) Filed: Feb. 3, 2016

(65) Prior Publication Data

US 2016/0343397 A1 Nov. 24, 2016

(30) Foreign Application Priority Data

May 19, 2015 (TW) .............................. 104115901 A

(51) Int. Cl.
*G11B 7/0065* (2006.01)
*G11B 7/1395* (2012.01)
(Continued)

(52) U.S. Cl.
CPC .......... *G11B 7/1395* (2013.01); *G11B 7/0065* (2013.01); *G11B 7/125* (2013.01);
(Continued)

(58) Field of Classification Search
None
See application file for complete search history.

(56) References Cited

U.S. PATENT DOCUMENTS 6,995,882 B2   2/2006  Horimai
7,002,891 B2   2/2006  Horimai
(Continued)

FOREIGN PATENT DOCUMENTS

CN   1280799 C     10/2006
CN   101159147 A    4/2008
(Continued)

OTHER PUBLICATIONS

Kenji Tanaka et al, "High density recording of 270 Gbits/inch2 in a coaxial holographic storage system," International Symposium on Optical Memory, Singapore, Oct. 21-25, 2007.
(Continued)

*Primary Examiner* — Brian Butcher
(74) *Attorney, Agent, or Firm* — CKC & Partners Co., Ltd.

(57) ABSTRACT

A holographic light-emitting module includes a light source module and a light shape control module. The light source module is configured to provide a signal light beam and a reference light beam, in which polarizations of the signal light beam and the reference light beam are orthogonal. The light shape control module is configured to receive the signal light beam and the reference light beam propagated from the light source module, in which the signal light beam and the reference light beam are modulated and emitted by the light shape control module The reference light beam is surrounded by the signal light beam and located at a center of the signal light beam, and the signal light beam and the reference light beam are partially overlapped.

20 Claims, 16 Drawing Sheets

(51) Int. Cl.
  *G11B 7/125* (2012.01)
  *G11B 7/1356* (2012.01)
  *G11B 7/1362* (2012.01)
  *G11B 7/1381* (2012.01)
  G11B 7/0037 (2006.01)
  G11B 7/00 (2006.01)

(52) U.S. Cl.
  CPC .......... *G11B 7/1356* (2013.01); *G11B 7/1362* (2013.01); *G11B 7/1381* (2013.01); *G11B 7/0037* (2013.01); G11B 2007/0009 (2013.01); G11B 2007/00653 (2013.01)

(56) References Cited

U.S. PATENT DOCUMENTS

| | | | |
|---|---|---|---|
| 7,085,025 B2 | 8/2006 | Horimai | |
| 7,085,026 B2 | 8/2006 | Horimai | |
| 7,130,092 B1 | 10/2006 | Horimai | |
| 7,321,541 B2 | 1/2008 | Horimai | |
| 2003/0063342 A1* | 4/2003 | Horimai | G03H 1/12 359/22 |
| 2004/0165518 A1 | 8/2004 | Horimai et al. | |
| 2004/0238643 A1 | 12/2004 | Park | |
| 2007/0121469 A1 | 5/2007 | Torii | |
| 2008/0192311 A1 | 8/2008 | Horimai | |
| 2014/0204437 A1 | 7/2014 | Ayres et al. | |

FOREIGN PATENT DOCUMENTS

| | | |
|---|---|---|
| CN | 100440378 C | 12/2008 |
| CN | 100511438 C | 7/2009 |
| EP | 1909268 A1 | 4/2008 |
| TW | 200828288 A | 7/2008 |
| TW | 200901176 A | 1/2009 |
| TW | 200943288 A | 10/2009 |

OTHER PUBLICATIONS

Kenji Tanaka et al, "Improved performance in coaxial holographic data recording," Optics Express, vol. 15, No. 24, Nov. 24, 2007.
Hideyoshi Horimai et al, "Collinear holography," Applied Optics, vol. 44, No. 13, pp. 2575-2579, May 1, 2005.
Hideyoshi Horimai et al, "Collinear technology for a holographic versatile disk," Applied Optics, vol. 45, No. 5, Feb. 10, 2006, pp. 910-914.

* cited by examiner (a) $z = z_1$ 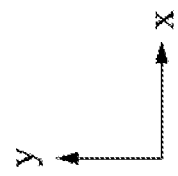
Fig. 6A
(a) $z = z_2$ 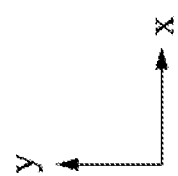
Fig. 6B
(a) $z = z_3$ 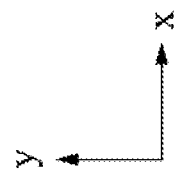
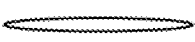
Fig. 6C

HOLOGRAPHIC LIGHT-EMITTING MODULE AND HOLOGRAPHIC STORAGE SYSTEM USING THE SAME

RELATED APPLICATIONS

This application claims priority to Taiwanese Application Serial Number 104115901, filed May 19, 2015, which is herein incorporated by reference.

BACKGROUND

Technical Field

The present disclosure relates to a holographic light-emitting module and a holographic storage system using the holographic light-emitting module.

Description of Related Art

With the development of technology, the amount of storage capacity required for electronic files has correspondingly increased. A typical away of storing data involves recording magnetic or optical changes on the surface of a recording medium, and the magnetic or optical changes are taken as the basis of the data. Examples of such recording mediums include floppy disks and compact discs. However, with continued increases in the amount of storage capacity required for electronic files, the development of holographic storage technology has been attracting the attention of those in the field.

With holographic storage technology, image data can be written into a recording medium a photosensitive medium) via interference between a signal light beam and a reference light beam. When the image data are read, the image data can be generated by emitting the reference light beam into the recording medium (photosensitive medium) again, and the generated image data can be read by a detector. In other words, the storage capacity of the holographic storage technology is related to the signal light beam and the reference light beam.

SUMMARY

An aspect of the present disclosure provides a holographic storage system configured to provide a signal light beam and a reference light beam, in which the reference light beam is surrounded by the signal light beam. Under this configuration, since an incident area of the signal light beam is increased, each written page of a disk can store more data. Furthermore, the amount of the data written into the disk per unit time can be increased, and hence the speed of a writing operation is accelerated. Therefore, under the configuration that the reference light beam is surrounded by the signal light beam, the usage rate of photosensitive material of the disk is improved, thereby improving the efficiency of the writing operation of the holographic storage system.

An aspect of the present disclosure provides a holographic light-emitting module including a light source module and a light shape control module. The light source module is configured to provide a signal light beam and a reference light beam, in which polarizations of the signal light beam and the reference light beam are orthogonal. The light shape control module is configured to receive the signal light beam and the reference light beam propagated from the light source module, in which the signal light beam and the reference light beam are modulated and emitted by the light shape control module. The reference light beam is surrounded by the signal light beam and is located at a center of the signal light beam, and the signal light beam and the reference light beam are partially overlapped.

In some embodiments, the light shape control module includes a light-splitting module a first light-guiding module, a second light-guiding module, a half-wavelength plate, a first light-blocking component, and a light-converging module. The light-splitting module is configured to receive the signal light beam and the reference light beam propagated from the light source module and to guide and emit the signal light beam and the reference light beam. The first light-guiding module is configured to receive the signal light beam propagated from the light-splitting module and to guide the signal light beam back to the light-splitting module. The second light-guiding module is configured to receive the reference light beam propagated from the light-splitting module and to guide the reference light beam back to the light-splitting module in which the signal light beam and the reference light beam guided back to the light-splitting module are propagated toward the same direction from the same side of the light-splitting module. The half-wavelength plate is disposed at the side of the light-splitting module and in an optical path of the reference light beam, such that the signal light beam and the reference light beam passing through the half-wavelength plate have the same polarization. The first light-blocking component is disposed in an optical path of the signal light beam and configured to block a portion of the signal light beam, such that the signal light beam passing through the first light-blocking component is hollow. The light-converging module is disposed in the optical path of the reference light beam and configured to converge the reference light beam. A cross-sectional area of the converged reference light beam corresponds to a cross-sectional area of the hollow area of the signal light beam, such that the reference light beam is surrounded by the signal light beam.

In some embodiments, each of the first light-guiding module and the second light-guiding module includes a mirror. The light-splitting module includes a first polarizing beam splitter and a second polarizing beam splitter. The first polarizing beam splitter is configured to receive the signal light beam and the reference light beam propagated from the light source module, in which the signal light beam passing through the first polarizing beam splitter is propagated toward the mirror of the first light-guiding module, and the reference light beam reflected from the first polarizing beam splitter is propagated toward the mirror of the second light-guiding module. The second polarizing beam splitter is configured to receive the signal light beam and the reference light beam reflected from the mirrors of the first light-guiding module and the second light-guiding module respectively. The signal light beam passes through the second polarizing beam splitter, and the reference light beam is reflected from the second polarizing beam splitter. The first light-blocking component is disposed between the first polarizing beam splitter and the first light-guiding module, and the light-converging module is disposed between the first polarizing beam splitter and the second polarizing beam splitter.

In some embodiments, the light-converging module includes a long-focal-length lens and a short-focal-length lens. One of the long-focal-length lens and the short-focal-length lens is disposed between the first polarizing beam splitter and the mirror of the second light-guiding module, and another of the long-focal-length lens and the short-focal-length lens is disposed between the mirror of the second light-guiding module and the second polarizing beam splitter.

In some embodiments, the light-converging module includes at least one cylindrical lens.

In some embodiments, the number of the cylindrical lenses is two, and focusing directions of the two cylindrical lenses are orthogonal to each other.

In some embodiments, the light-splitting module includes a first polarizing beam splitter configured to receive the signal light beam and the reference light beam propagated from the light source module. The signal light beam passes through the first polarizing beam splitter, and the reference light beam is reflected from the first polarizing beam splitter. The first light-guiding module includes a mirror and a first quarter-wavelength plate. The mirror is configured to reflect the signal light beam passing through the first polarizing beam splitter back to the first polarizing beam splitter. The first quarter-wavelength plate is disposed between the mirror and the first polarizing beam splitter.

In some embodiments, the first light-blocking component is disposed between the mirror and the first quarter-wavelength plate.

In some embodiments, the first light-blocking component is disposed between the light source module and the light-splitting module.

In some embodiments, the light-converging module includes a converging lens disposed between the first polarizing beam splitter and the half-wavelength plate.

In some embodiments, the second light-guiding module includes a curved mirror and a second quarter-wavelength plate. The curved mirror is configured to reflect the reference light beam reflected from the first polarizing beam splitter back to the first polarizing beam splitter. The second quarter-wavelength plate is disposed between the curved mirror and the first polarizing beam splitter.

In some embodiments, the holographic light-emitting module further includes a second light-blocking component disposed between the curved mirror and the second quarter-wavelength plate.

In some embodiments, the curved mirror has different focusing positions in a vertical direction and a horizontal direction.

In some embodiments, the second light-guiding module includes a flat mirror, a focusing lens, and a second quarter-wavelength plate. The flat mirror is configured to reflect the reference light beam reflected from the first polarizing beam splitter back to the first polarizing beam splitter. The focusing lens is disposed between the flat mirror and the first polarizing beam splitter for converging the reference light beam, in which the focusing lens has different focusing positions in a vertical direction and a horizontal direction. The second quarter-wavelength plate is disposed between the flat mirror and the first polarizing beam splitter.

In some embodiments, the light shape control module further includes an active rotator connected to the second light-guiding module and configured to adjust an incident angle of the reference light beam guided back to the light-splitting module.

In some embodiments, the signal light beam and the reference light beam provided by the light source module have the same light-intensity with a hollow distribution.

An aspect of the present disclosure provides a holographic storage system including a holographic light-emitting module, a spatial light modulator (SLM), light-splitting unit, a lens system, a dichroic beam splitter, an object lens and The spatial light modulator is configured to receive the signal light beam and the reference light beam provided by the holographic light-emitting module. The spatial light modulator emits the signal light beam and the reference light beam toward the light-splitting unit, and the signal light beam and the reference light beam propagated from the light-splitting unit and through the lens system, the dichroic beam splitter, and the object lens in sequence are emitted toward a disk. The optical filter disposed at a corresponding position between the light-splitting unit and the object lens in an optical path of the reference light beam, in which the optical filter includes a polarizer and a third quarter-wavelength plate. The polarizer is configured to allow the reference light beam provided by the light-splitting unit to pass therethrough. The third quarter-wavelength plate is disposed on the polarizer, in which the polarizer faces toward a corresponding side of the light-splitting unit in the optical path of the reference light beam.

In some embodiments, the optical filter is disposed between the dichroic beam splitter and the object lens.

In some embodiments, the lens system includes a first lens and a second lens. The signal light beam and the reference light beam propagated from the light-splitting unit pass through the first lens and the second lens in sequence, and the optical filter is disposed between the first lens and the second lens.

In some embodiments, w hen a position of the disk is written by the holographic storage systems the reference light beam provided by the spatial light modulator has a number of polarizations in which the polarizations of the reference light beam are orthogonal to each other.

BRIEF DESCRIPTION OF THE DRAWINGS

FIGS. 6A to 6C are schematic diagrams of incident surfaces of he reference light beam at different positions in FIG. 5;

DETAILED DESCRIPTION

Figure 1:
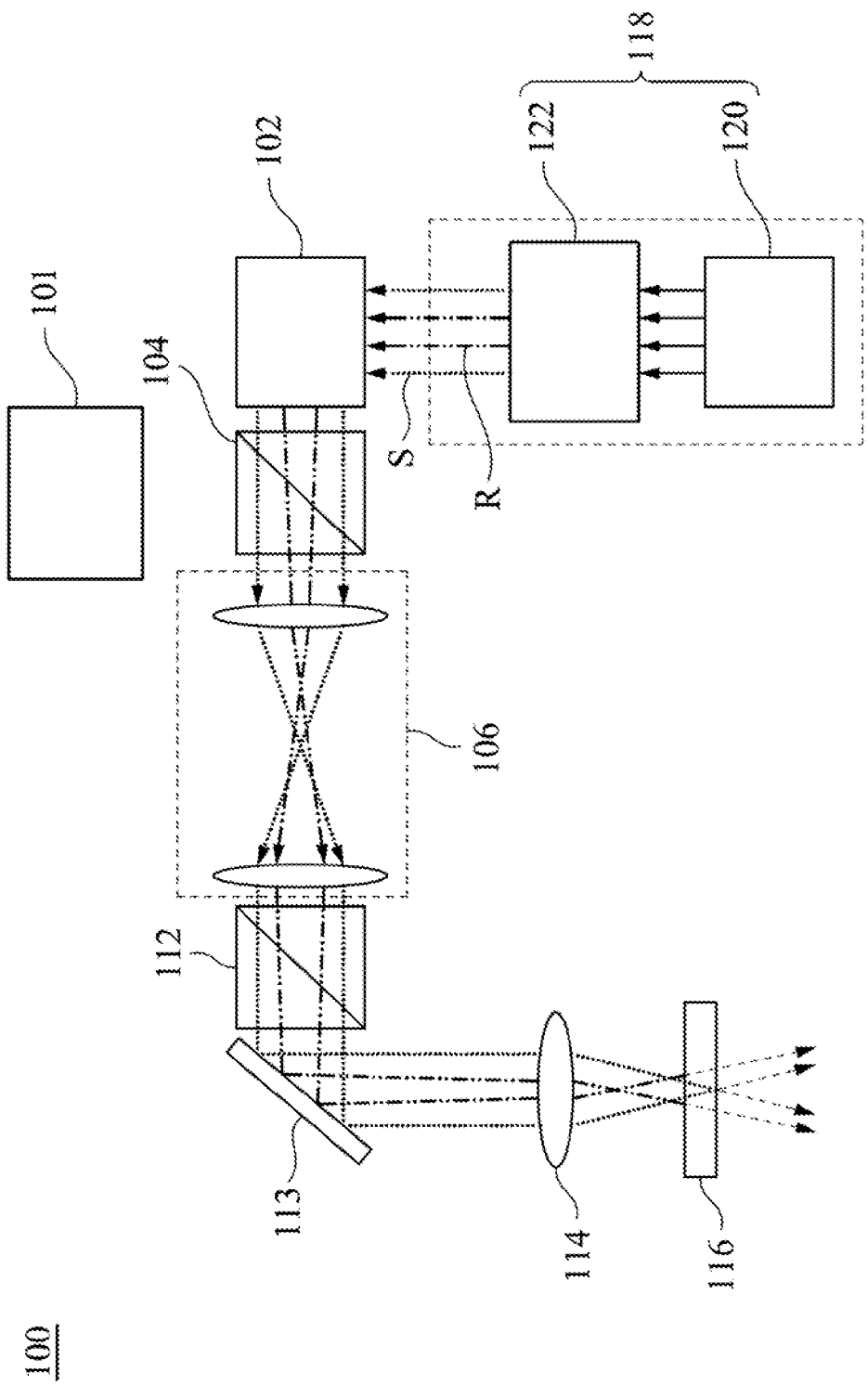
FIG. 1 is a schematic diagram of an arrangement of a holographic storage system according to a first embodiment of present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, third etc, may be used herein to describe various elements, components, regions, layers and/or sections, these elements; components, regions, layers and/or sections should not be limited by these terms. Thus, a first element, component, region, layer or section discussed below could be termed a second element, component, region, layer or section without departing from the teachings of the present disclosure.

In a coaxial holographic storage system, since a signal light beam is surrounded by a reference light beam, the reference light beam has to occupy a certain area of a writing surface (or an incident surface), thereby ensuring sufficient mixing efficiency between the signal light beam and the reference light beam. However, under this configuration, during a writing operation or a loading operation of the holographic storage system, energy waste may occur.

In view of this, a holographic light-emitting module of the present disclosure provides a reference light beam and a signal light beam, in which the reference light beam is surrounded by the signal light beam. Under this configuration, each written page of the disk can store more data. Furthermore, the amount of data written into the disk per unit time is increased. That is, the speed of a writing operation is accelerated. Therefore, under the configuration that the reference light beam surrounded by the signal light beam, the usage rate of photosensitive material of the disk is improved, thereby improving the efficiency of the waiting operation of a holographic storage system.

Figure 2:
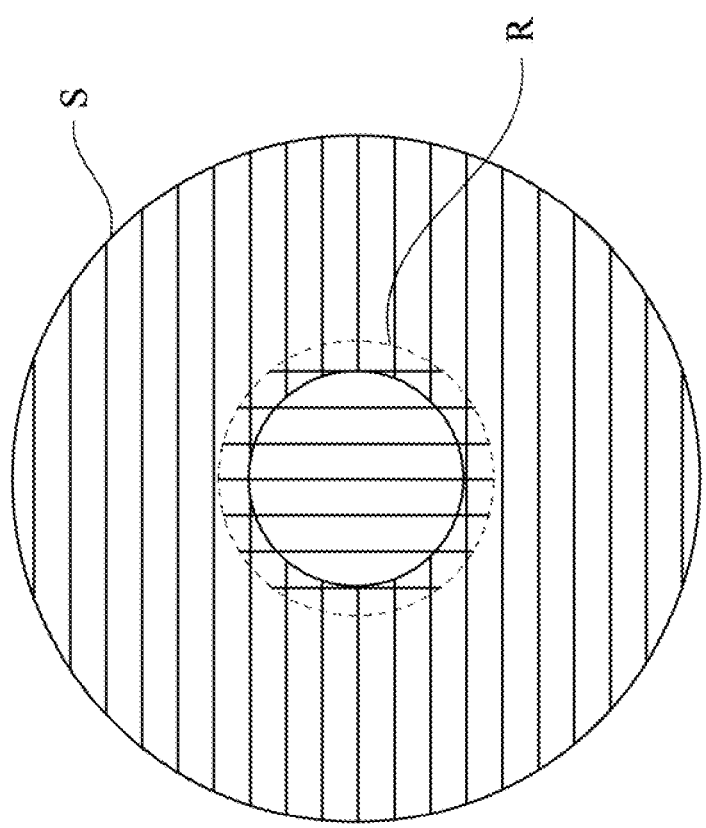
FIG. 2 is a schematic diagram of incident surfaces of a signal light beam and a reference light beam which are emitted toward the spatial light modulator by the holographic light-emitting module in FIG. 1.

FIG. 1 is a schematic diagram of an arrangement of a holographic storage system according to a first embodiment of present disclosure. FIG. 2 is a schematic diagram of incident surfaces of a signal light beam and a reference light beam which are emitted toward the spatial light modulator by the holographic light-emitting module in FIG. 1.

As shown in FIG. 1 and FIG. 2, a holographic storage system 100 includes a holographic light-emitting module 118, a spatial light modulator (SLM) 102, a light-splitting unit 104, a lens system 106, a dichroic beam splitter 112 a reflecting unit 113, and an object lens 114. The holographic light-emitting module 118 includes a light source module 120 and a light shape control module 122. The light source module 120 is configured to provide a signal light beam S and a reference light beam R. After the signal light beam S and the reference light beam R are modulated by the light shape control module 122, the signal light beam S and the reference light beam R are emitted toward the spatial light modulator 102.

In the present embodiment, when a dish 116 is written by the holographic storage system 100, the holographic light-emitting module 118 can be used as a beginning of an optical path of the holographic storage system 100. After the signal light beam S and the reference light beam R are received by the spatial light modulator 102, the signal light beam S and the reference light beam R are propagated toward the light-splitting unit 104 by the spatial light modulator 102. Then, in the optical path of the holographic storage system 100, the signal light beam S and the reference light beam R are propagated through the light-splitting unit 104, the lens system 106, the dichroic beam splitter 112, and the object lens 113 in sequence, and are emitted toward the disk 116.

After the signal light beam S and the reference light beam R provided by the light source module 120 are modulated by the light shape control module 122, the signal light beam S and the reference light beam R are emitted toward the spatial light modulator 102. In the present embodiment, the reference light beam R is surrounded by the signal light beam S and located at a center of the signal light beam S, and the signal light beam S and the reference light beam R are partially overlapped as shown in FIG. 2. As illustrated in FIG. 2, an incident surface of the signal light beam S is illustrated as horizontal lines, the incident surface of t he reference light beam R is illustrated as vertical lines, in which the region that the horizontal lines and the vertical lines overlap each other represents the region that the signal light beam S and the reference light beam R overlap each other. FIG. 2 is an exemplary diagram, and the arrangement of the signal light beam S and the reference light beam R is not limited thereto. The signal light beam S and the reference light beam R may overlap each other at the inner boundary and the outer boundary respectively.

Under this configuration, since the signal light beam S and the reference light beam R are modulated by the light shape control module 122, the signal light beam S and the reference light beam R emitted toward the spatial light modulator 102 can have approximately the same energy, when the initial energy of the signal light beam S and that of the reference light beam R are controlled by the light source module 120. Moreover, in the incident surface of the light beams emitted from the holographic storage system 100 to the disk 116, since the disk 116 can be written by the signal light beam S with a greater area, an amount of data written into the disk 116 per unit time is correspondingly increased. Furthermore, in the single disk 116, by using the signal light beam S with the greater area, the total amount of the data allowed to be written into the disk 116 can be increased. That is, the usage rate of storage material in the disk 116 can be improved effectively, thereby improving the performance of the writing operation of the holographic storage system 100.

Furthermore, when the disk 116 is loaded by the holographic storage system 100, the reference light beam R is emitted along the same optical path as the writing operation by the holographic storage system 100. Then, after the reference light beam R is diffracted in the disk 116, the reference light beam R is reflected from the disk 116 and back to the light-splitting unit 104, and then the reference light beam R enters an imaging unit 101 for being loaded. Under this configuration, when the disk 116 is loaded by the holographic storage system 100, the holographic storage system 100 can switch most of energy or power) into the reference light beam R, thereby improving the performance and accuracy of the loading operation.

Figure 3:
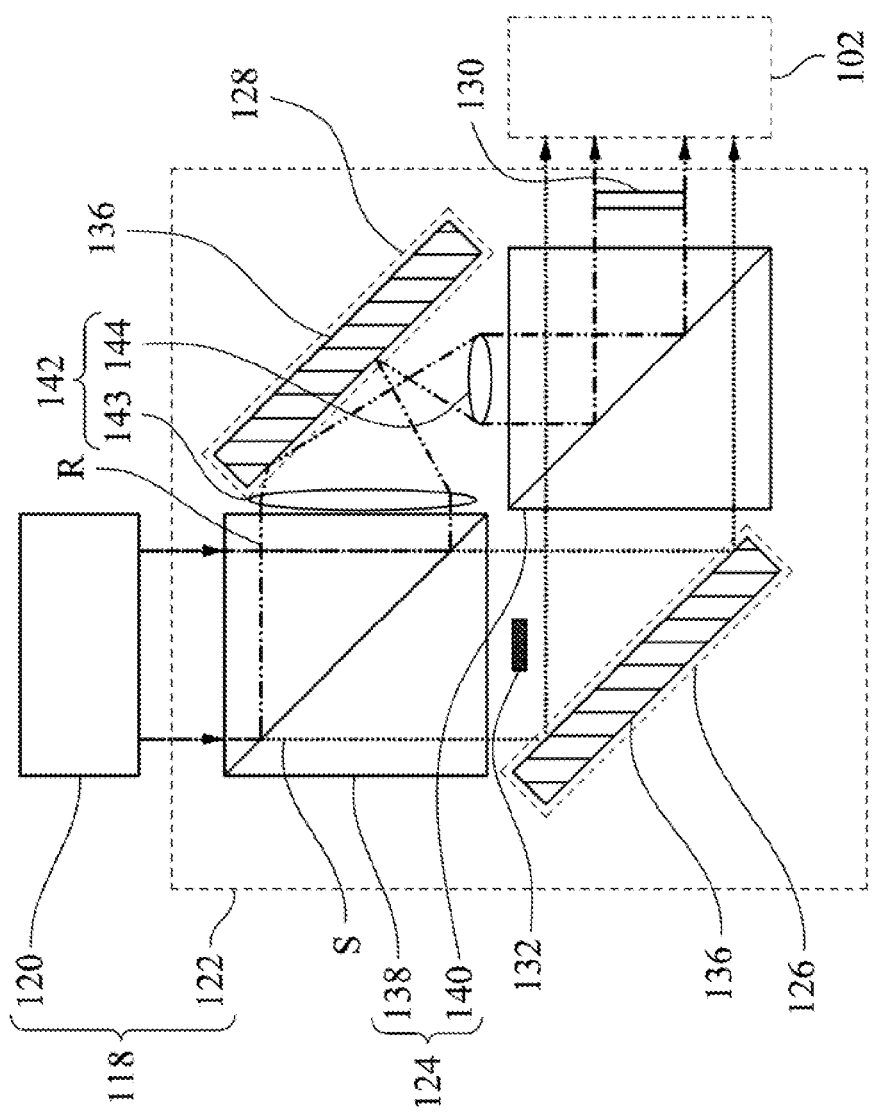
FIG. 3 is a schematic diagram of an arrangement of the holographic light-emitting module of the holographic storage system of FIG. 1.

FIG. 3 is a schematic diagram of an arrangement of the holographic light-emitting module of the holographic storage system of FIG. 1. As shown in FIGS. 2 and 3, in the present embodiment, the holographic light-emitting module 118 includes the light source module 120 and the light shape control module 122, in which the light source module 120 is configured to provide the signal light beam S and the reference light beam R. In addition, polarizations of the signal light beam S and the reference light beam R are orthogonal to each other. In some embodiments, the light source module 120 includes a polarizing controller (not illustrated), and the polarizing controller is configured to define the polarizations of the signal light beam S and the reference light beam R.

The light shape control module 122 includes a light-splitting module 124, a first light-guiding module 126, a second light-guiding module 128, a half-wavelength plate 130, a first light-blocking component 132, and a light-converging module 142. The light-splitting module 124 is configured to receive the signal light beam S and the reference light beam R propagated from the light source module 120 and to guide and emit the signal light beam S and the reference light beam R. In the present embodiment, the light-splitting module 124 includes a first polarizing beam splitter 138 and a second polarizing beam splitter 140. The first polarizing beam splitter 138 is configured to guide the signal light beam S and the reference light beam R propagated from the light source module 120, such that the signal light beam S and the reference light beam R propagated from the light source module 120 can be propagated from the first polarizing beam splitter 138 toward different directions. The signal light beam S passes through the first polarizing beam splitter 138 and is propagated toward the first light-guiding module 126, and the reference light beam R is reflected from the first polarizing beam splitter 138 and is propagated toward the second light-guiding module 128.

The first light-guiding module 126 is configured to receive the signal light beam S propagated from the light-splitting module 124 and to guide the signal light beam S back to the light-splitting module 124. The second light-guiding module 128 is configured to receive the reference light beam R propagated from the light-splitting module 124 and to guide the reference light beam R back to the light-splitting module 124, in which the signal light beam S and the reference light beam R guided back to the light-splitting module 124 are propagated toward the same direction from the same side of the light-splitting module 124. In addition, in the present embodiment, each of the first light-guiding module 126 and the second light-guiding module 128 includes a mirror 136.

The signal light beam S and the reference light beam R reflected from the mirrors 136 of the first light-guiding module 126 and the second light guiding module 128 can enter the second polarizing beam splitter 140 of the light-splitting module 124, and the signal light beam S and the reference light beam R are propagated along the same direction from the same side of the second polarizing beam splitter 140. In other words, the second polarizing beam splitter 140 is configured to receive the signal light beam S and the reference light beam R reflected from the mirrors 136 of the first light-guiding module 126 and the second light-guiding module 128, in which the signal light beam S passes through the second polarizing beam splitter 140, and the reference light beam R is reflected from the second polarizing beam splitter 140.

The first light-blocking component 132 is disposed in an optical path of the signal light beam S and located between the first polarizing beam splitter 38 and the first light-guiding module 126. The first light-blocking component 132 is configured to block a portion of the signal light beam S, such that the signal light beam S passing through the first light-blocking component 132 is hollow. The light-converging module 142 is disposed in an optical path of the reference light beam R and located between the first polarizing beam splitter 138 and the second polarizing beam splitter 140.

The light-converging module 142 is configured to converge the reference light beam R, in which a cross-sectional area of the converged reference light beam R corresponds to a cross-sectional area of the hollow area of the signal light beam S, such that the reference light beam R is surrounded by the signal light beam S. In addition, the light-converging module 142 includes a long-focal-length lens 143 and a short-focal-length lens 144. One of the long-focal-length lens 143 and the short-focal-length lens 144 is disposed between the first polarizing beam splitter 138 and the mirror 136 of the second light-guiding module 128 and another of the long-focal-length lens 143 and the short-focal-length lens 144 is disposed between the mirror 136 of the second light-guiding module 128 and the second polarizing beam splitter 140.

The half-wavelength plate 130 is disposed at the side of the light-splitting module 124 and in the optical path of the reference light beam R, such that the signal light beam S and the reference light beam R passing through the half-wavelength plate 130 have the same polarization. Furthermore, the half-wavelength plate 130 is disposed at the side of the second polarizing beam splitter 140, and the dimension of the half-wavelength plate 130 corresponds to the cross-sectional area of the converged reference light beam R.

Under this configuration, the arrangement of the signal light beam S and the reference light beam R propagated from the light shape control module 122 toward the spatial light modulator 102 is that the reference light beam R surrounded by the signal light beam S, in which the reference light beam R is located at the center of the signal light beam S, as shown in FIG. 2. The following descriptions are provided with respect to the optical paths of the signal light beam S and the reference light beam R.

In the optical path of the signal light beam S, after the signal light beam S is emitted by the light source module 120, the signal light beam S is propagated through the first polarizing beam splitter 138 the first light-blocking component 132, the mirror 136 of the first light-guiding module 126, and the second polarizing beam splitter 140 of the light-splitting module 124 in sequence and then toward the spatial light modulator 102.

The polarization of the signal light beam S corresponds to the first polarizing beam splitter 138, such that the signal light beam S can pass through the first polarizing beam splitter 138 and be propagated toward the first light-blocking component 132. When the signal light beam S passes through the first light-blocking component 132, the portion of the signal light beam S cannot pass through the first light-blocking component 1 due to blocking of the first light-blocking component 132, such that the light shape of the signal light beam S is hollow, as shown in FIG. 2. Then the signal light beam S is reflected from the mirror 136 of the first light-guiding module 126 toward the second polarizing beam splitter 140. Similarly, the polarization of the signal light beam S corresponds to the second polarizing beam splitter 140, such that the signal light beam S can pass through the second polarizing beam splitter 140 and be propagated toward the spatial light modulator 102.

In the optical path of the reference light beam R after the reference light beam R is emitted by the light source module 120, the reference light beam R is propagated through the first polarizing beam splitter 138, the long-focal-length lens 143 and the short-focal-length lens 144 of the light-converging module 142, the mirror 136 of the second light-guiding module 128, the second polarizing beam splitter 140 of the light-splitting module 124, and the half-wavelength plate 130 in sequence and toward the spatial light modulator 102.

The polarization of the reference light beam R corresponds to the first polarizing beam spitter 138, such that the reference light beam R can be reflected from the first polarizing beam splitter 138 and be propagated toward the long-focal-length lens 143. When the reference light beam R passes through the long-focal-length lens 143, the reference light beam R is converged and propagated toward the mirror 136 of the second light-guiding module 128. Then, the reference light beam R is reflected from the mirror 136 and propagated toward the short-focal-length lens 144. In an arrangement of the long-focal-length lens 143 and the short-focal-length lens 144, the focuses of the long-focal-length lens 143 and the short-focal-length lens 144 are located at the same point. Therefore; when the reference light beam R is propagated toward the short-focal-length lens 144, the reference light beam. R converged by the long-focal-length lens 143 is focused on the focus of the short-focal-length lens 144, such that the reference light beam R passing through the short-focal-length lens 144 can become a parallel light beam and be propagated toward the second polarizing beam splitter 140. Similarly, the polarization of the reference light beam R corresponds to the second polarizing beam splitter 140, such that the reference light beam R can be reflected from the second polarizing beam splitter 140 and be propagated toward the half-wavelength plate 130. Since the polarizations of the signal light beam S and the reference light beam R propagated from the light source module 120 are orthogonal to each other, the polarizations of the signal light beam S and the reference light beam R have the same polarization after the reference light beam R passes through the half-wavelength plate 130. After the polarization of the reference light beam R is converted, the reference light beam R is propagated toward the spatial light modulator 102.

As previously described, in the present embodiment, the signal light beam S and the reference light beam R with the polarizations that orthogonal to each other are emitted toward the light shape control module 122 by the light source module 120, in which the signal light beam S and the reference light beam R are separated by the fight-splitting module 124 of the light shape control module 122 through the polarizations, such that the signal light beam S and the reference light beam R can be respectively modulated. After the signal light beam S and the reference light beam R are respectively modulated, the reference light beam R is surrounded by the signal light beam S and located at the center of the signal light beam 5, in which the signal light beam S and the reference light beam R are partially overlapped. Then, the signal light beam S and the reference light beam R that have been modulated are propagated toward the spatial light modulator 102 from the light shape control module 122.

Figure 4:
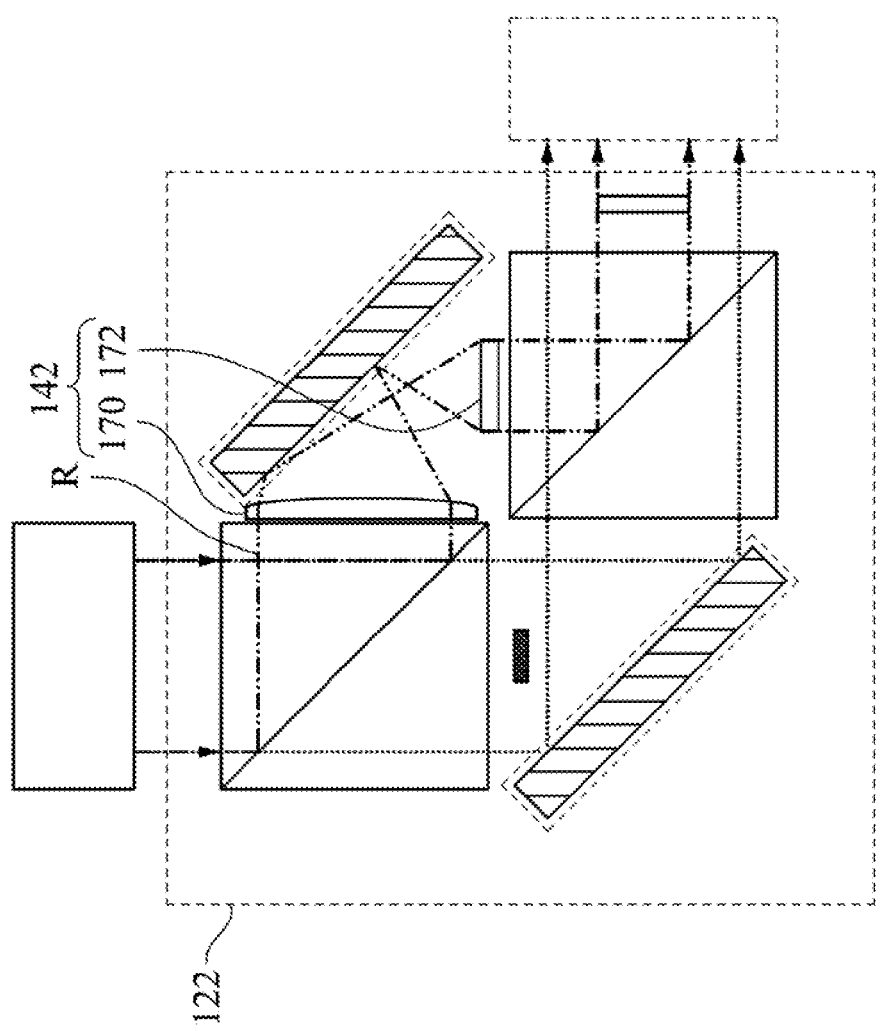
FIG. 4 is a schematic diagram of an arrangement of a holographic storage system according to a second embodiment of present disclosure.

FIG. 4 is a schematic diagram of an arrangement of a holographic storage system according to a second embodiment of present disclosure. The difference between the present embodiment and the first embodiment is that the light-converging module 142 includes cylindrical lenses 170 and 172.

When the reference light beam R propagated by the light shape control module 122 is a spherical wave, in order to enable the light beam propagated by the light shape control module 122 to have an optimized property, the reference light beam R with the spherical wave can have different focusing depths in a vertical direction and a horizontal direction. Herein, the term "optimized property" is that during the writing operation of the holographic storage system, a gap between the written pages in the disk can become stable through adjusting. With the different boundary conditions, for example, qualities of a camera (thus, a detector) or a disk, the gap condition in the written disk is correspondingly different. For the gaps with the different conditions, the parameter of the reference light beam R and the gap condition of the disk can match each other by adjusting the focusing depths of the reference light beam R in the vertical direction and the horizontal direction, thereby improving the system stability of the holographic storage system.

In the present embodiment, the number of the cylindrical lenses of the light-converging module 142 is two (the cylindrical lenses 170 and 172), and the focusing directions of the cylindrical lenses 170 and 172 are orthogonal to each other. Therefore, when the reference light beam R passes through the cylindrical lens 170, one direction of the light sharp of the reference light beam R is converged. Then, when the reference light beam R passes through the cylindrical lens 172, another direction of the light sharp of the reference light beam R is converged, in which these two converged directions are orthogonal to each other. In other words, after the reference light beam R passes through the cylindrical lenses 170 and 172, the reference light beam R can have a pair of different focusing depths in a pair of directions which are orthogonal to each other. The following descriptions are provided with respect to the light sharp of the reference light beam R.

Figure 5:
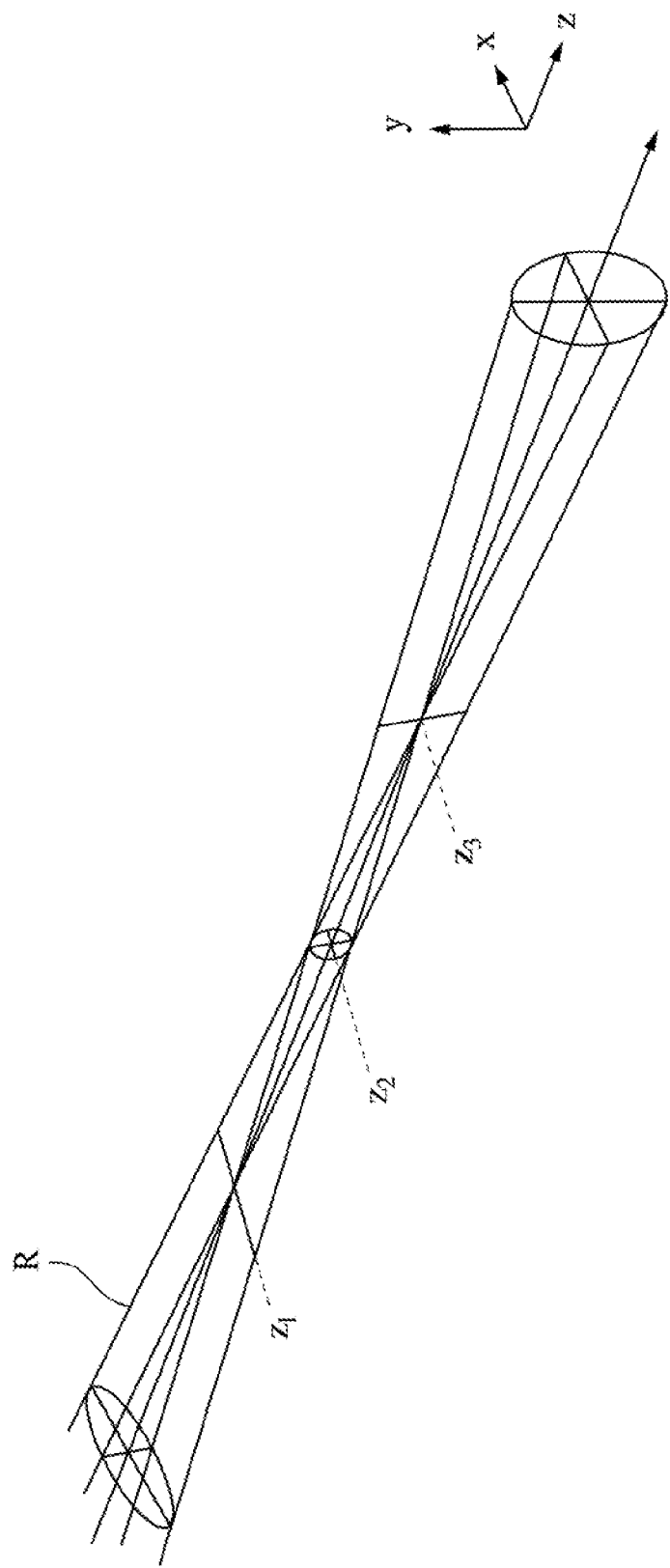
FIG. 5 is a schematic diagram of a light shape of a reference light beam emitted by the light shape control module of FIG. 4.

FIG. 5 is a schematic diagram of a light shape of a reference light beam emitted by the light shape control module of FIG. 4. FIGS. 6A to 6C are schematic diagrams of incident surfaces of the reference light beam at different positions in FIG. 5. In FIG. 5, the reference light beam R is propagated by the light shape control module 122 (see FIG. 4) after being modulated, in which the reference light beam R propagated by the light shape control module 122 travels along the z-direction.

As previously described, the reference light beam R has a pair of the different focusing depths in a pair of the directions which are orthogonal to each other, in which the orthogonal directions can include the x-direction and the y-direction. In other words, the reference light beam R has different focusing depths in the x-direction and the y-direction.

As shown in FIG. 5, when the reference light beam R travels to the location $z=z_1$, the reference light beam R is focused in the y-direction but not focused in the x-direction. The distribution of the light sharp of the reference light beam R is illustrated as FIG. 6A. When the reference light beam R travels to the location $z=z_2$, the reference light beam R is not focused in the y-direction and the x-direction, and the light sharp of the reference light beam R has a minimum-circle distribution. The distribution of the light sharp of the reference light beam R is illustrated as FIG. 6B. When the reference light beam R travels to the location $z=z_3$, the reference light beam R is focused in the x-direction but not focused in the y-direction. The distribution of the light sharp of the reference light beam R is illustrated as FIG. 6C.

In other words, in addition to the arrangement that the reference light beam is surrounded by the signal light beam, the light shape control module of the present embodiment can modulate the reference light beam to have a pair of different focusing depths in a pair of directions which are orthogonal to each other, such that the light beam propagated by the light shape control module can have the optimized parameter.

Figure 7:
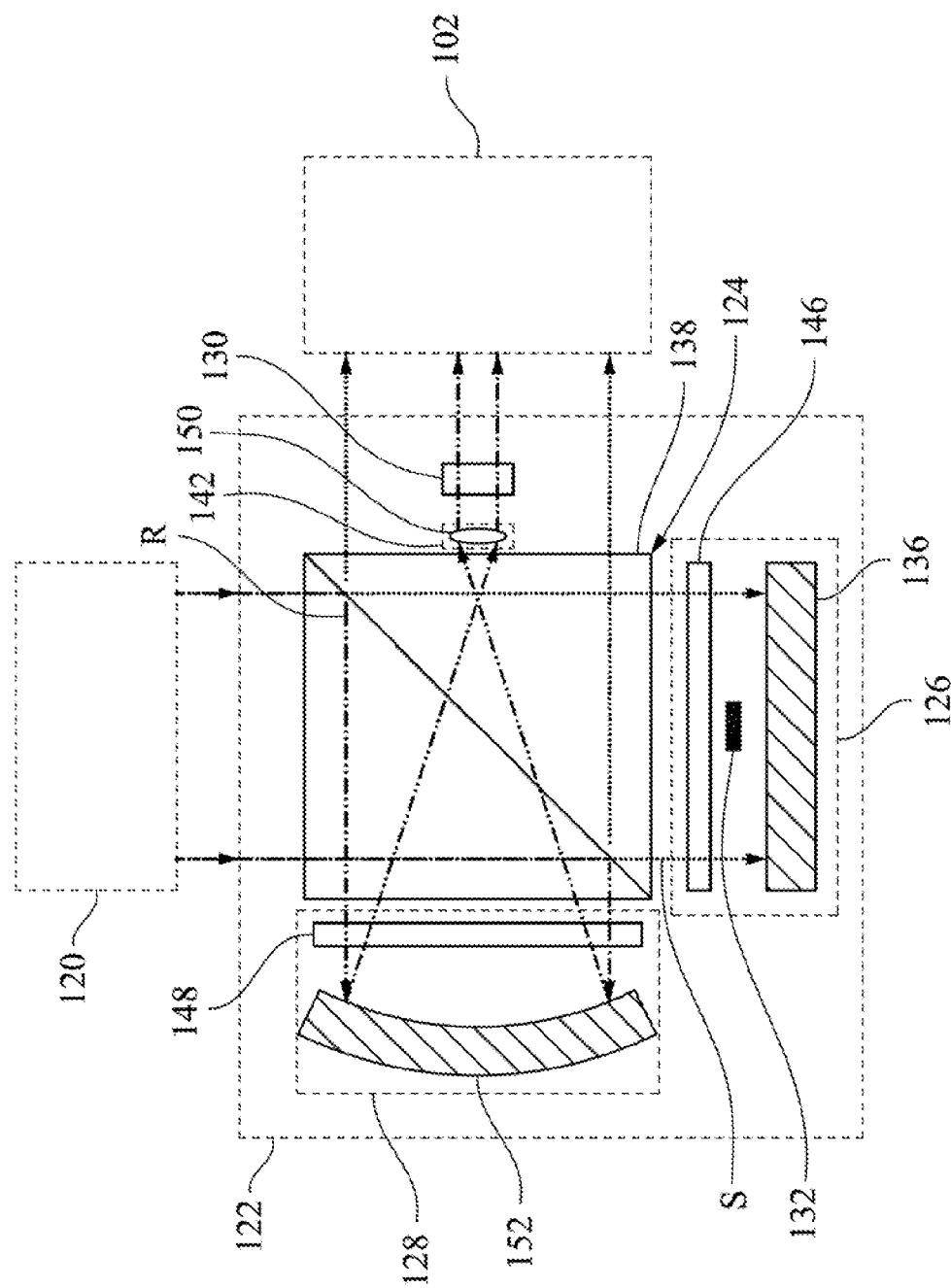
FIG. 7 is a schematic diagram of an arrangement of a holographic storage system according to a third embodiment of present disclosure.

FIG. 7 is a schematic diagram of an arrangement of a holographic storage system according to a third embodiment of present disclosure. The difference between the present embodiment and the first embodiment is that the number of the polarizing beam splitter is one.

In the present embodiment, the light-splitting module 124 includes the first polarizing beam splitter 138. The first polarizing beam splitter 138 is configured to receive the signal light beam S and the reference light beam R propagated from the light source module 120. The signal light beam S passes through the first polarizing beam splitter 138 and toward the first light-guiding module 126, and the reference light beam R is reflected from the first polarizing beam splitter 138 toward the second light-guiding module 128.

The first light-guiding module 126 includes a mirror 136 and a first quarter-wavelength plate 146. The mirror 136 is configured to reflect the signal light beam S passing through the first polarizing beam splitter 138 back to the first polarizing beam splitter 138. The first quarter-wavelength plate 146 is disposed between the mirror 136 and the first polarizing beam splitter 138. Furthermore, the first light-blocking component 132 is disposed between the mirror 136 and the first quarter-wavelength plate 146.

The second light-guiding module 128 includes a curved mirror 152 and a second quarter-wavelength plate 148. The curved mirror 152 is configured to reflect the reference light beam R reflected from the first polarizing beam splitter 138 back to the first polarizing beam splitter 138. In the present embodiment, the curved mirror 152 is a concave mirror, and this concave mirror is configured to focus the parallel incident light beam on the focus thereon (thus, the focus of the concave mirror). The second quarter-wavelength plate 148 is disposed between the curved mirror 152 and the first polarizing beam splitter 138.

The light-converging module 142 includes a converging lens 150. The converging lens 150 is disposed between the first polarizing beam splitter 138 and the half-wavelength plate 130. Furthermore the focuses of the converging lens 150 and the curved mirror 152 are located at the same position, such that the light beam focused by the curved mirror 152 is correspondingly or focused on the focus of the converging lens 150.

Under this configuration, since the number of the polarizing beam splitter is one, such that the elements in the light shape control module 122 can be arranged more closely, thereby reducing the volume of the light shape control module 122. In addition, the arrangement of the signal light beam S and the reference light beam R propagated from the light shape control module 122 toward the spatial light modulator 102 is still that the reference light beam R is surrounded by the signal light beam S. The following descriptions are provided with respect to the optical paths of the signal light beam S and the reference light beam R.

In the optical path of the signal light beam S after the signal light beam S is emitted by the light source module 120, the signal light beam S is propagated through the first polarizing beam splitter 138 of the light-splitting module 124, the first quarter-wavelength plate 146, the first light-blocking component 132, the mirror 136 of the first light-guiding module 126, the first light-blocking component 132, the first quarter-wavelength plate 146, and the first polarizing beam splitter 138 of the fight-splitting module 124 in sequence and toward the spatial light modulator 102.

The polarization of the signal light beam S corresponds to the first polarizing beam splitter 138, such that the signal light beam S can pass through the first polarizing beam splitter 138 and be propagated toward the first quarter-wavelength plate 146. After the signal light beam S passes through the first quarter-wavelength plate 146, the polarization of the signal light beam S is rotated by 90 degree. Then, when the signal light beam S passes through the first light-blocking component 132, the portion of the signal light beam S cannot pass through the first light-blocking component 132 due to the blocking of the first light-blocking component 132, such that the light shape of the signal light beam S is hollow, as shown in FIG. 2. The hollow signal light beam S is reflected from the mirror 138 of the first light-guiding module 126 toward the first quarter-wavelength plate 148. As the signal light beam S passes through the first quarter-wavelength plate 146 again, the polarization of the signal light beam S is rotated by 90 degrees again. That is, the phase difference between the signal light beam S passing through the first quarter-wavelength plate 146 twice and the signal light beam S provided by the light source module 120 is 180 degrees. Therefore, when the returning signal light beam S enters the first polarizing beam splitter 138, the signal light beam S is reflected from the first polarizing beam splitter 138 toward the spatial light modulator 102.

In the optical path of the reference light beam R, after the reference light beam R is emitted by the light source module 120, the reference light beam R is propagated through the first polarizing beam splitter 138 of the light-splitting module 124, the second quarter-wavelength plate 148, the curved mirror 152 of the second light-guiding module 128, the second quarter-wavelength plate 148, the first polarizing beam splitter 138, the converging lens 150 of the light-converging module 142, and the half-wavelength plate 130 in sequence and toward the spatial light modulator 102.

The polarization of the reference light beam R corresponds to the first polarizing beam splitter 138; such that the reference light beam R can be reflected from the first polarizing beam splitter 138 and be propagated toward the second quarter-wavelength plate 148. After the reference light beam R passes through the second quarter-wavelength plate 148, the polarization of the reference light beam R is rotated by 90 degrees and is propagated toward the curved mirror 152. Then, after the reference light beam R is reflected from the curved mirror 152, the reference light beam R passes through the second quarter-wavelength plate 148 again, such that the polarization of the reference light beam R is rotated by 90 degrees again. That is the polarization between the reference light beam R passing through the first quarter-wavelength plate 146 twice and the reference light beam R provided by the light source module 120 is 180 degrees. Therefore, when the returning reference light beam R enters the first polarizing beam splitter 138, the reference light beam R passes through the first polarizing beam splitter 138 and then is propagated toward the converging lens 150. After the reference light beam R passes through the converging lens 150, the reference light beam R may become a parallel light beam and be propagated toward the half-wavelength plate 130. Similarly, since the polarizations of the signal light beam S and the reference light beam R provided by the light source module 120 are orthogonal to each other, after the reference light beam R passes through the half-wavelength plate 130, the polarizations of the signal light beam S and the reference light beam R are the same. Furthermore, after the reference light beam R passes through the half-wavelength plate 130, the reference light beam R is propagated toward the spatial light modulator 102.

As previously described, in order to enable the light beam propagated by the light shape control module 122 to have the optimized property, the reference light beam R with the spherical wave can have different focusing depths in the vertical direction and the horizontal direction. Therefore, in some embodiments, the curved mirror 152 has the different focusing positions in the vertical direction and the horizontal direction, such that the reference light beam R reflected from the curved mirror 152 may have the different focusing depths in a pair of directions that are orthogonal to each other.

Figure 8:
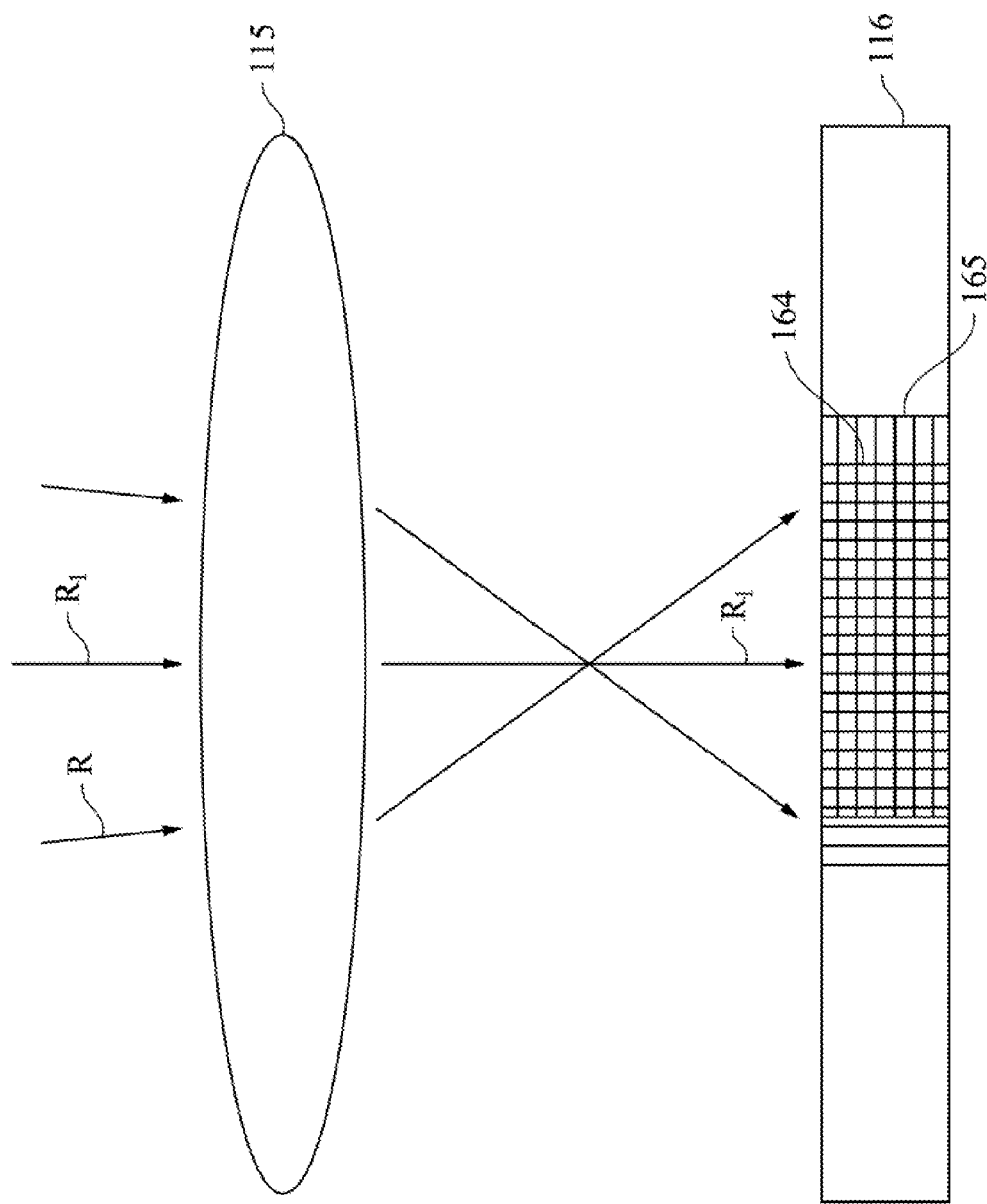
FIG. 8 is a schematic diagram that a disk is written by a reference light beam when the reference light beam is located at a central position of a coaxial holographic storage system.

FIG. 8 is a schematic diagram that a disk is written by a reference light beam when the reference light beam is located at a central position of a coaxial holographic storage system.

In the writing operation of the disk 116, when the reference light beam R is emitted from a central position of a coaxial holographic storage system, since the reference light beam R corresponding to a central position of the disk 116 is a small-angle reference light beam $R_1$, the holographic storage system may have a lower displacement sensitivity. Herein, an angle in the term "small-angle reference light beam $R_1$" is included between the reference light beam $R_1$ and the optical axis of the object lens 115. For example, when the reference light beam $R_1$ is vertically emitted toward the disk 115, an angle between the reference light beam $R_1$ and the optical axis of the object lens 115 is approximately 90 degrees. Furthermore, the term "displacement sensitivity" means a discriminability between written pages 164 and 165 of the disk 116. As the displacement sensitivity is increased, a distance between the written pages 164 and 165 of the disk 116 can be closer. In other words, as the displacement sensitivity is decreased; the distance between the written pages 164 and 165 of the disk 116 is correspondingly increased.

Moreover, under the condition that the distance between the written pages 164 and 165 of the disk 116 is closer, the data written into the disk 116 by the coaxial holographic storage system can be correspondingly increased. That is, as the displacement sensitivity of the coaxial holographic storage system is increased, much more data can be written into the disk 116 by the coaxial holographic storage system.

In addition in the optical intensity distribution of the reference light beam R, as the percentage of the whole reference light beam R occupied by the reference light beam $R_1$ is lower, the coaxial holographic storage system may have the higher displacement sensitivity. Moreover, the displacement sensitivity also corresponds to background conditions of the coaxial holographic storage system, in which the background conditions include vibration or disk quality. Under the background conditions are allowable, by adjusting the displacement sensitivity of the coaxial holographic storage system, the data written into the disk 116 by the coaxial holographic storage system can be her increased.

Figure 9:
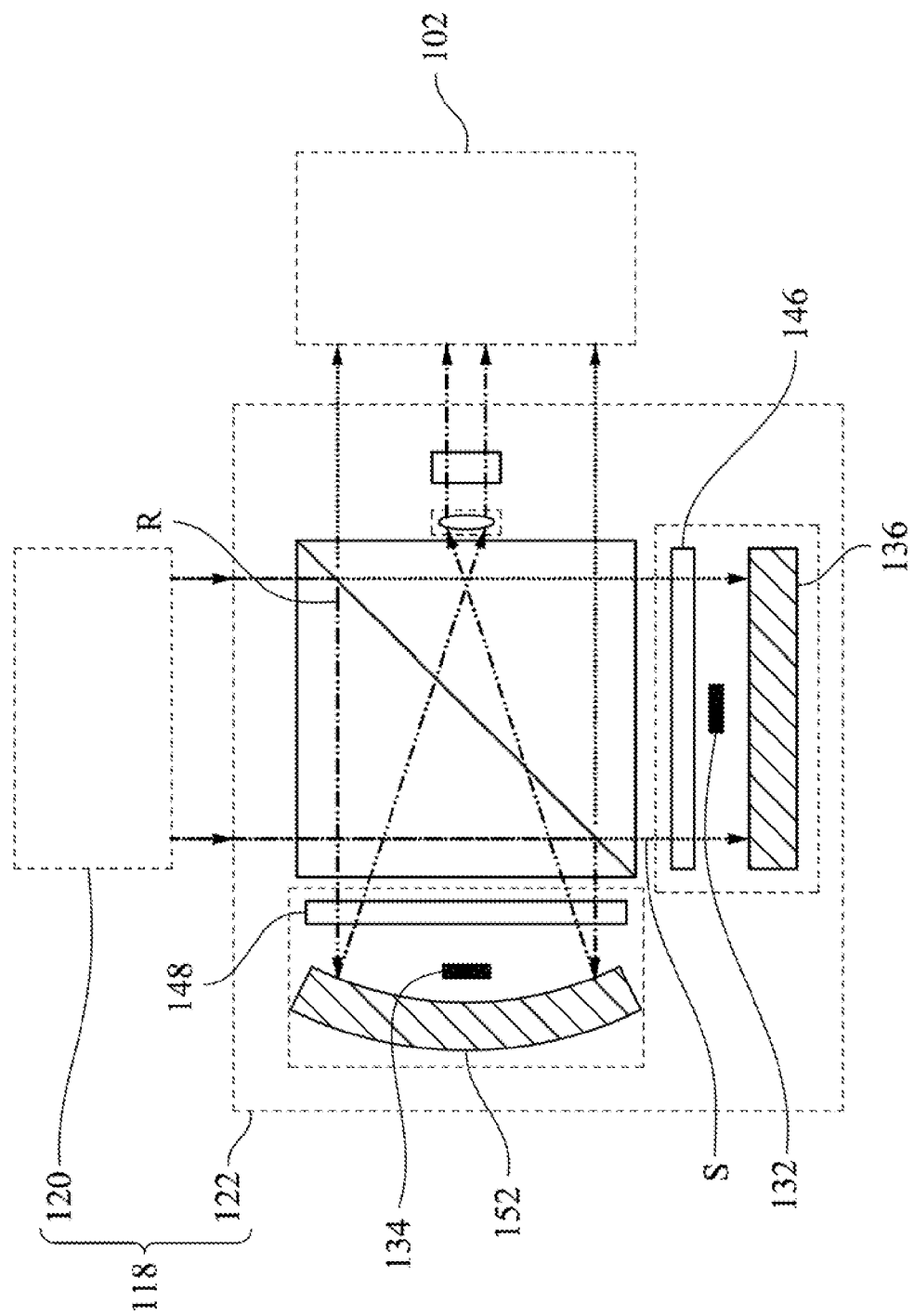
FIG. 9 is a schematic diagram of an arrangement of a holographic storage system according to a fourth embodiment of present disclosure.
Figure 10:
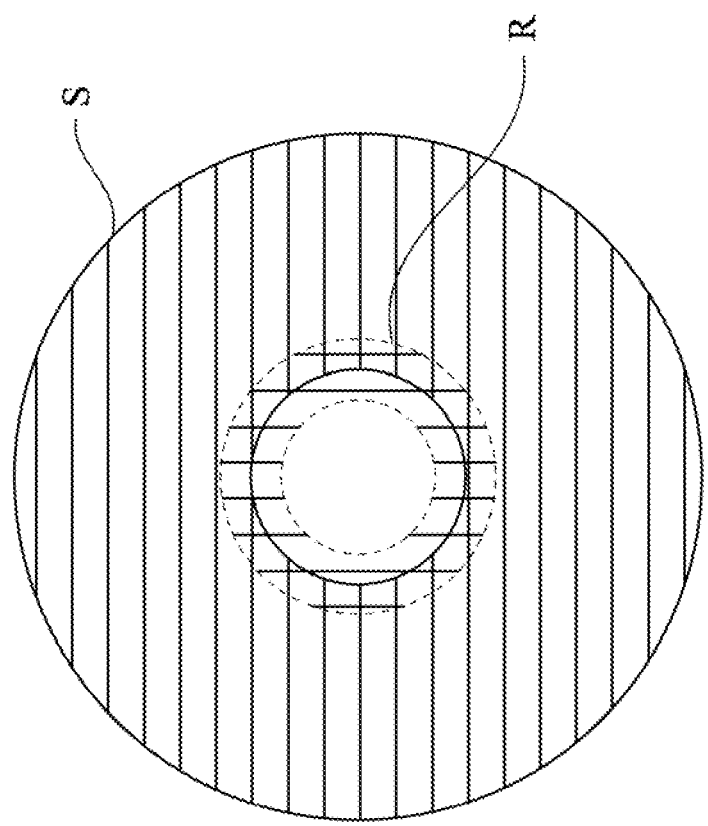
FIG. 10 is a schematic diagram of incident surfaces of a signal light beam and a reference light beam emitted by the holographic light-emitting module in FIG. 9.

FIG. 9 is a schematic diagram of an arrangement of a holographic storage system according to a fourth embodiment of present disclosure. FIG. 10 is a schematic diagram of incident surfaces of a signal light beam and a reference light beam emitted by the holographic light-emitting module in FIG. 9. The difference between the present embodiment and the third embodiment is that the holographic light-emitting module 118 of the present embodiment further includes a second light-blocking component 134.

As shown in FIG. 9, the holographic light-emitting module 118 further includes the second light-blocking component 134 disposed between the curved or 152 and the second quarter-wavelength plate 148. Therefore, when the reference light beam R passes through the second light-blocking component 134, since a portion of the reference light beam R is blocked by the second light-blocking component 134, the light shape of the reference light beam R is hollow In other words, the optical intensity distribution of the reference light beam R modulated by the light shape control module 122 is hollow. Furthermore, since the first light-blocking component 132 is disposed between the first quarter-wavelength plate 146 and the mirror 136, the signal light beam S is still hollow. T he incident surfaces of the signal light beam S and the reference light beam R emitted by the light shape control module 122 are shown in. FIG. 10. As shown in FIG. 10, the incident surface of the signal light beam S is illustrated as horizontal lines, the incident surface of the reference light beam R is illustrated as vertical lines, in which the region that the horizontal lines and the vertical lines overlap each other represents the region that the signal light beam S and the reference light beam R overlap each other. Similarly, FIG. 10 is an exemplary diagram, and the arrangement of the signal light beam S and the reference light beam R is not limited thereto. The signal light beam S and the reference light beam R may overlap each other with the inner boundary and the outer boundary respectively.

Under this configuration, the optical intensity distribution of the reference light beam R is hollow. Therefore, since the percentage of the whole reference light beam R occupied by the reference light beam $R_1$ is reduced, the displacement sensitivity of the holographic storage system improved. Moreover, since the displacement sensitivity of the holographic storage system is improved, much more data can be written into the disk 116 by the holographic storage system.

Furthermore, as the first light-blocking component 132 and the second light-blocking component 134 have the same area, the areas of the signal light beam S and the reference light beam R blocked by the first light-blocking component 132 and the second light-blocking component 134 are the same. In other words, when the light source module 120 provides the signal light beam S and the reference light beam R with the same energy (or the same intensity), the blocked energies of the signal light beam S and the reference light beam R are the same. Therefore, although the signal light beam S and the reference light beam R modulated by light shape control module 122 have the different incident surfaces (see FIG. 10), the signal light beam S and the reference light beam R have the same energy (or the same optical intensity) That is, the energy ratio (or the optical intensity ratio) of the signal light beam S to the reference light beam R is 1.

Furthermore, in some embodiments, when one position of the disk 116 is written by the holographic storage system 100, the reference light beams R provided by the spatial light modulator 102 can have a number of polarizations, in which the polarizations of the reference light beams R are orthogonal to each other. That is, when one position (or one point) of the disk 116 is written by the holographic storage system 100, with modulating the reference light beams R by the spatial light modulator 102, the data of the different pages can be written into the same position of the disk 116 by the reference light beams R with the polarizations that orthogonal to each other. In other words, by using the spatial light modulator 102 to modulate the reference light beams R, the displacement sensitivity of the holographic storage system can be adjusted, such that the data of the adjacent pages or the same page can be written by using the reference light beams R with the polarizations that are orthogonal to each other, thereby increasing the amount of data stored in the disk 116.

Figure 11:
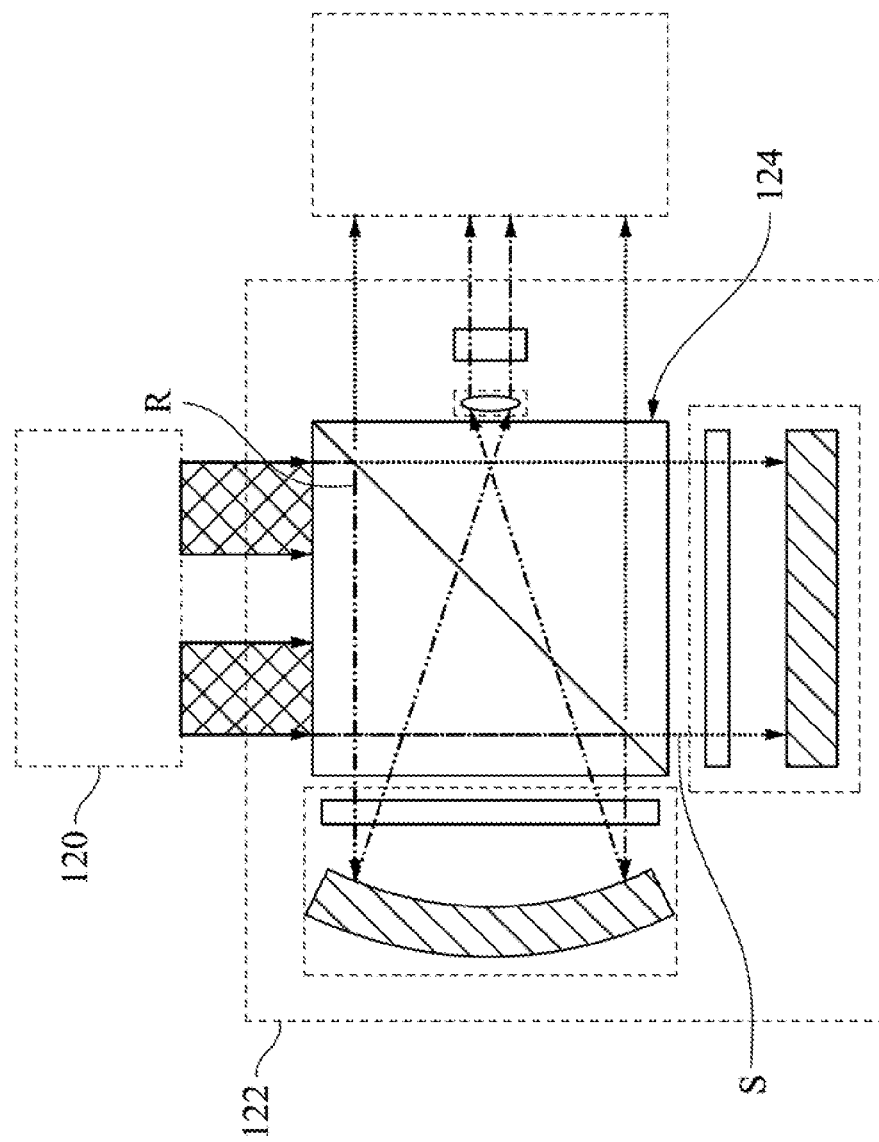
FIG. 11 is a schematic diagram of an arrangement of a holographic storage system according to a fifth embodiment of present disclosure.

FIG. 11 is a schematic diagram of an arrangement of a holographic storage system according to a fifth embodiment of present disclosure. The difference between the present embodiment and the fourth embodiment is that the signal light beam S and the reference light beam R provided by the light source module 120 have the same light-intensity with a hollow distribution, as shown in the shadow regions between the light source module 120 and the light source module 122 in FIG. 11. In the present embodiment, the first light-blocking component 132 and the second light-blocking component 134 (see FIG. 9) are replaced by this light-intensity with the hollow distribution. In addition, for making the illustration succinct, only the outer boundaries of the signal light beam S and the reference light beam R are illustrated in FIG. 11.

Under this configuration, since the light source module 120 provides the signal light beam S and the reference light beam R with the same energy, the signal light beam S and the reference light beam R entering the light shape control module 122 also have the same energy. Therefore, the signal light beam S and the reference light beam R modulated by the light shape control module 122 have the same energy, in which the energy ratio of the signal light beam S to the reference light beam R is 1.

Figure 12:
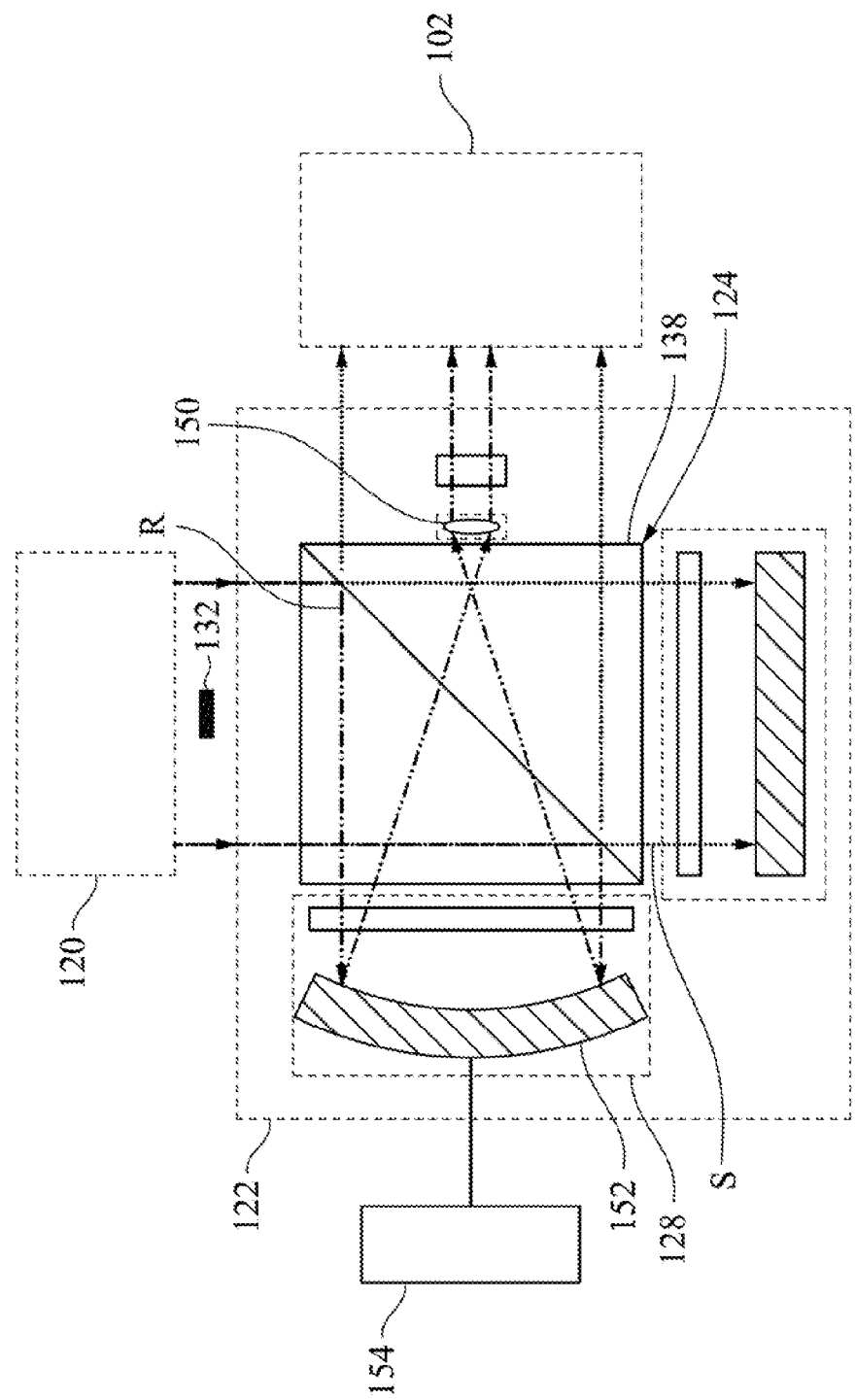
FIG. 12 is a schematic diagram of an arrangement of a holographic storage system according to a sixth embodiment of present disclosure.

FIG. 12 is a schematic diagram of an arrangement of a holographic storage system according to a sixth embodiment of present disclosure. The difference between the present embodiment and the third embodiment is that the first light-blocking component 132 of the present embodiment is disposed between the light source module 120 and the light-splitting module 124.

Under this configuration, since the first light-blocking component 132 is disposed between the light source module 120 and the first polarizing beam splitter 138 of the light-splitting module 124 the signal light beam S and the reference light beam R pass through the first light-blocking component 132 before entering the first polarizing beam splitter 138 at the first time. When portions of the signal light beam S and the reference light beam R pass through the first light-blocking component 132, the portions of the signal light beam S and the reference light beam R can not pass through the first light-blocking component 132 due to blocking of the first light-blocking component 132, such that the light shapes of the signal light beam S and the reference light beam R are hollow. Then, in the following optical path of the reference light beam R, the reference light beam R is converged by the converging lens 150, such that the reference light beam R can be surrounded by the signal light beam S and have the hollow optical-intensity distribution.

In addition, in some embodiments, the light shape control module 122 further includes an active rotator 154, in which the active rotator 154 may be a micro motor or an actuator. The active rotator 154 is connected to the second light-guiding module 128, in which the active rotator 154 is configured to adjust an incident angle of the reference light beam R guided back to the light-splitting module 124. For example, in the present embodiment, the active rotator 154 is connected to the curved mirror 152 of the second light-guiding module 128, so as to adjust the incident angle of the reference light beam R reflected from the mirror 152 toward the first polarizing beam splitter 138 of the light-splitting module 124.

As previously described, in the writing operation, when the reference light, beam R is propagated toward the disk 116 (see FIG. 8), the small-angle reference light beam R1 may reduce the displacement sensitivity of the holographic storage system. Therefore, by using the active rotator 154 connected to the curved mirror 152, the incident angle of the reference light beam R entering the first polarizing beam splitter 138 can be controlled. In other words, the incident angle of the reference light beam R propagated from the light shape control module 122 toward the spatial light modulator 102 can be controlled, thereby adjusting the displacement sensitivity of the holographic storage system. Moreover, when one position of the disk 116 is written by the light beams with the different incident conditions (for example, different incident angles), the one position can record the data of more than one page.

Figure 13:
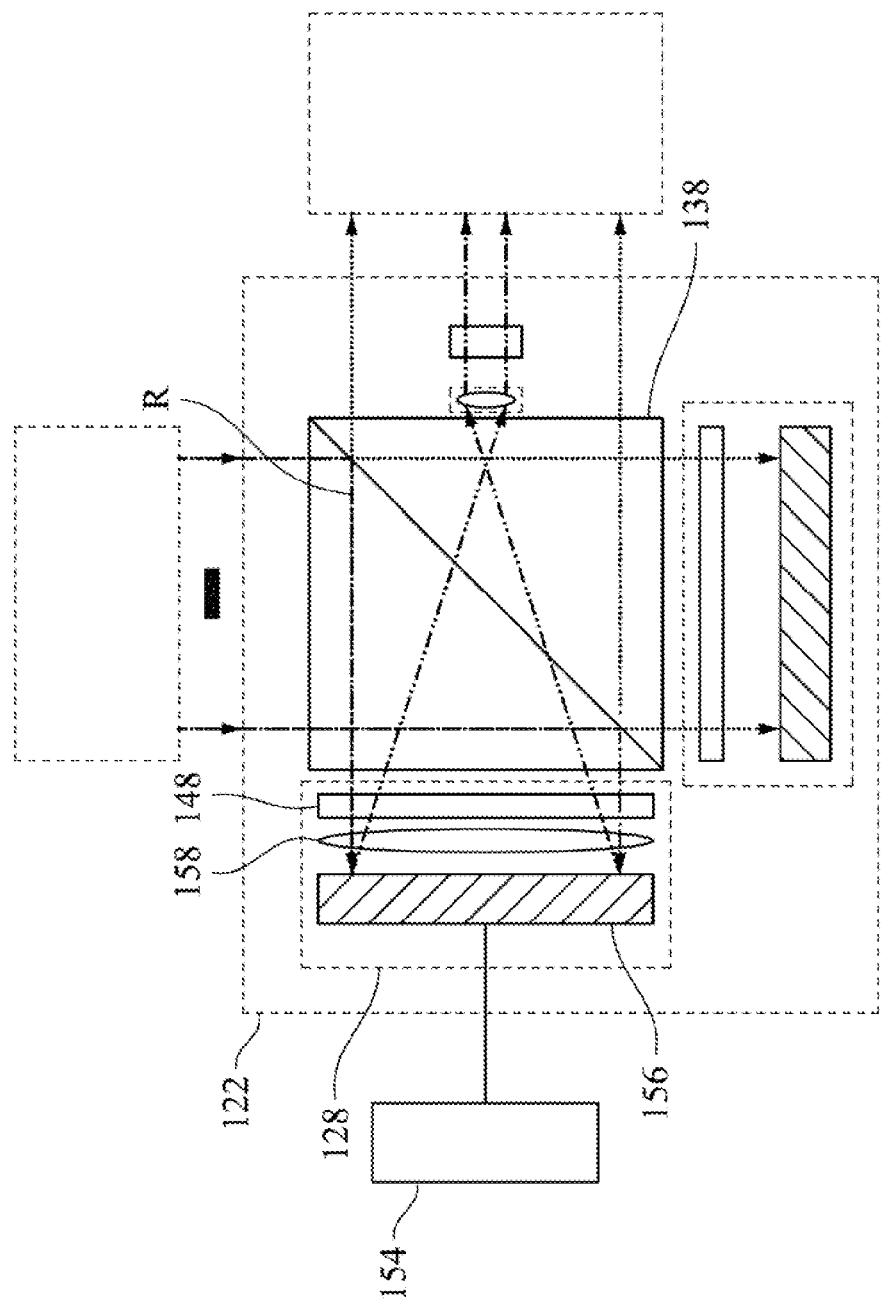
FIG. 13 is a schematic diagram of an arrangement of a holographic storage system according to a seventh embodiment of present disclosure.

FIG. 13 is a schematic diagram f an arrangement of a holographic storage system according to a seventh embodiment of present disclosure. The difference between the present embodiment and the sixth embodiment is that the second light-guiding module 128 includes a flat mirror 156 and a focusing lens 158.

In the present embodiment, the second light-guiding module 128 includes the flat mirror 156, the focusing lens 158, and the second quarter-wavelength plate 148. The flat mirror 156 is configured to reflect the reference light beam R reflected from the first polarizing beam splitter 138 back to the first polarizing beam splitter 138. The focusing lens 158 is disposed between the flat mirror 156 and the first polarizing beam splitter 138 for converging the reference light beam R, in which the focusing lens 158 has different focusing positions in the vertical direction and the horizontal direction. The second quarter-wavelength plate 148 is disposed between the flat mirror 156 and the first polarizing beam splitter 138.

As previously described, as the focusing positions of the reference light beam R are modulated to have different focusing depths in a pair of directions that orthogonal to each other, the light beam propagated by the light shape control module 122 can have the optimizing property. Therefore, by disposing the focusing lens 158, the reference light beam R guided by the second light-guiding module 128 can have different focusing positions in the vertical direction and the horizontal direction.

Similarly, in the present embodiment, the active rotator 154 can be connected to the fiat mirror 156 so as to adjust the incident angle of the reference light beam R propagated from the flat mirror 156 toward the first polarizing beam splitter 138, thereby adjusting the displacement sensitivity of the holographic storage system.

Figure 14:
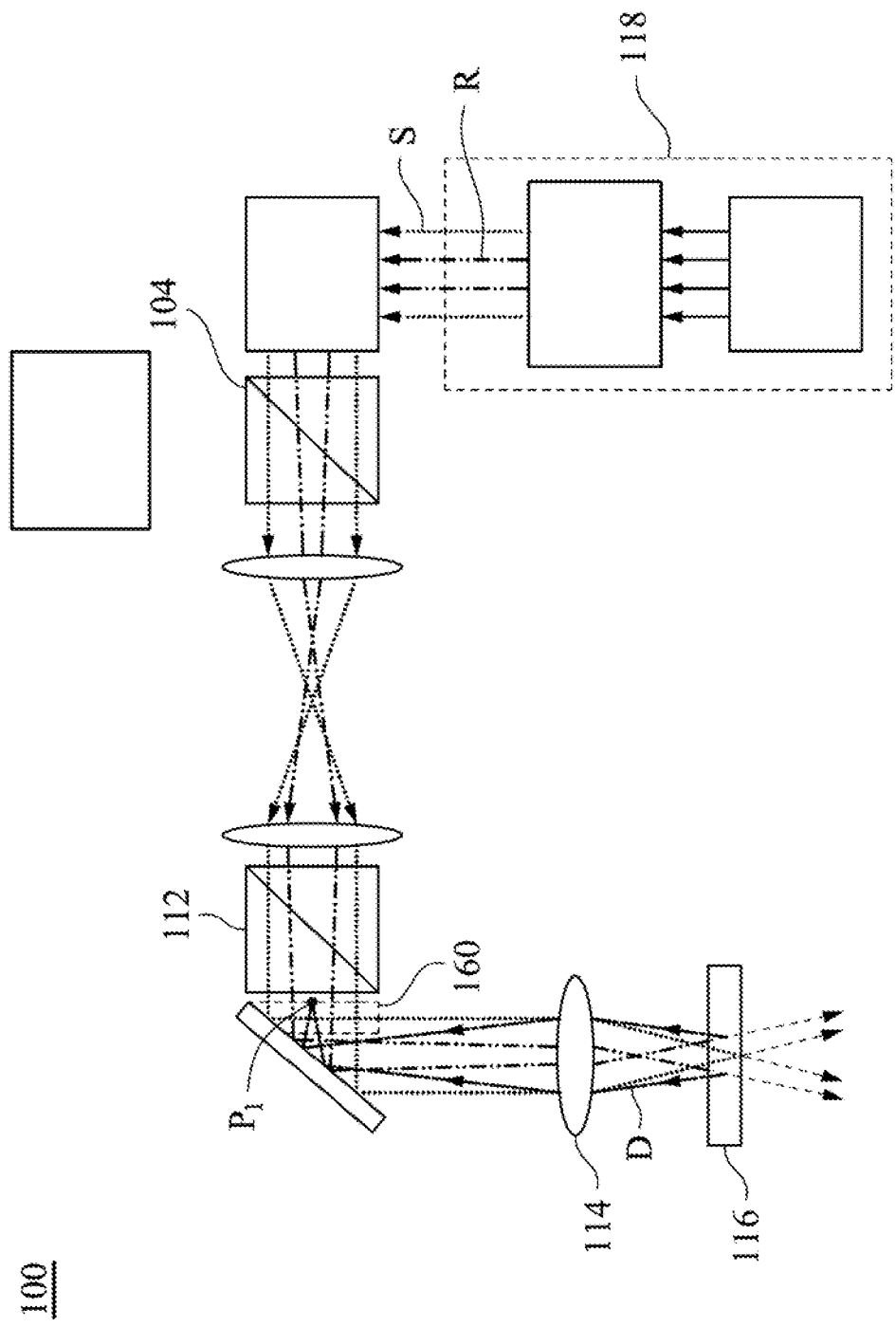
FIG. 14 is a schematic diagram of an arrangement of a holographic storage system according to an eighth embodiment of present disclosure.
Figure 15:
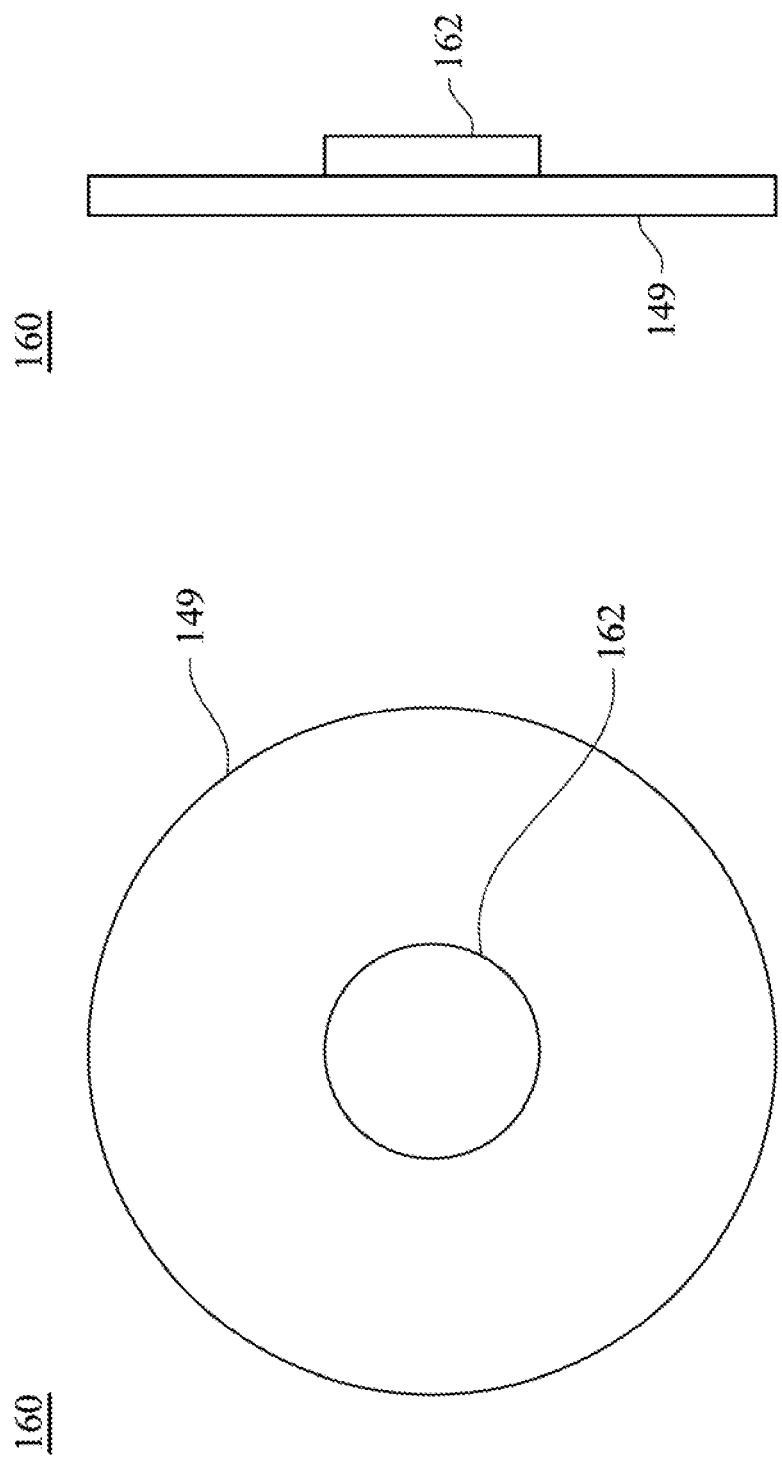
FIGS. 15A and 15B respectively illustrate a schematic front view and a schematic side view of the optical filter of FIGS. 14.

FIG. 14 is a schematic diagram of an arrangement of a holographic storage system according to an eighth embodiment of present disclosure. FIGS. 15A and 15B respectively illustrate a schematic front view and a schematic side view of the optical filter of FIG. 14. The difference between the present embodiment and the first embodiment is that the holographic storage system 100 of the present embodiment further includes an optical filter 160, in which the optical filter 160 is disposed at a corresponding position between the light-splitting unit 104 and the object lens 144 in the optical path of the reference light beam R.

When the holographic storage system 100 performs the loading operation, the reference light beam R is emitted toward the disk 116 by the holographic storage system 100, and the reference light beam R diffracted in the disk 116 is taken as a loading light beam. However, when a portion of the reference light beam R is not converted into a diffracting light, this portion of the reference light beam R will reflect from the disk 116 and become a noise light beam D. Furthermore, after the reference light beam R is modulated by the holographic light-emitting module 118, according to the different designs, the reference light beam R may have different wave types. For example, a diverging spherical wave, a plane wave or a converging spherical wave. No matter what the wave type of the reference light beam R is in the optical path of the reference light beam R reflected from the disk 116 the reference light beam R may have a status of being focused on a point. That is, in order to prevent the noise light beam D from affecting the loading operation, the optical filter 160 can be designed to dispose at the focusing position of the noise light beam D.

In the present embodiment, the holographic storage system 100 is configured to provide the reference light beam R with the converging spherical wave. For making the description succinct, the signal light beam S and the reference light beam R emitted by the holographic light-emitting module 118 are illustrated in FIG. 14. As previously described, when the holographic storage system 100 performs the loading operation the portion of the reference light beam R becomes the noise light beam D at the disk 116, and this noise light beam D may be focused on the position $P_1$. Therefore, in the present embodiment, the optical filter 160 is disposed at the position $P_1$. That is, the optical filter 160 is disposed between the dichroic beam splitter 112 and the object lens 114.

As shown in FIGS. 15A and 15B, the optical filter includes a polarizer 162 and a third quarter-wavelength plate 149. The polarizer 162 is configured to allow the reference light beam R provided by the light-splitting unit 104 to pass therethrough. The third quarter-wavelength plate 149 is disposed on the polarizer 162, in which the polarizer 162 faces toward a corresponding side of the light-splitting unit 104 in the optical path of the reference light beam R.

In other words, the polarizer 162 corresponds to the signal light beam S and the reference light beam R emitted by the holographic light-emitting module 118, such that the signal light beam S and the reference light beam R can pass through the polarizer 162 of the optical filter 160 along the optical path from the holographic light-emitting module 118 toward the disk 116, and hence the disposition of the optical filter 160 may not affect the writing operation. Furthermore, when the reference light beam R passes through the optical filter 160, the reference light beam R may pass through the third quarter-wavelength plate 149, and hence the polarization of the reference light beam R is rotated by 90 degrees.

Then, as far a the noise light beam D in the loading operation is concerned, in the optical path along which the noise light beam D is reflected from the disk 116 toward the holographic storage system 100, the noise light beam D passes through the optical filter 160 again. Since the polarizer 162 of the optical filter 160 faces toward the corresponding side of the light-splitting unit 104 in the optical path of the reference light beam R, the noise light beam passes through the third quarter-wavelength plate 149 and the polarizer 162 in sequence. As the noise light beam D passes through the third quarter-wavelength plate 149, the polarization of the noise light beam D is rotated by 90 degrees. That is, the phase difference between the polarization of the noise light beam D passing through the third quarter-wavelength plate 149 twice and the polarization of the reference light beam R emitted by the holographic light-emitting module 118 is 180 degrees. Under a condition that the reference light beam R emitted by the holographic light-emitting module 118 can pass through the polarizer 162, this noise light beam D cannot pass through the polarizer 162 due to the phase difference of 180 degrees. Therefore, by disposing the optical filter 160, the noise light beam D can be blocked, such that the noise in the loading operation is reduced.

Figure 16:
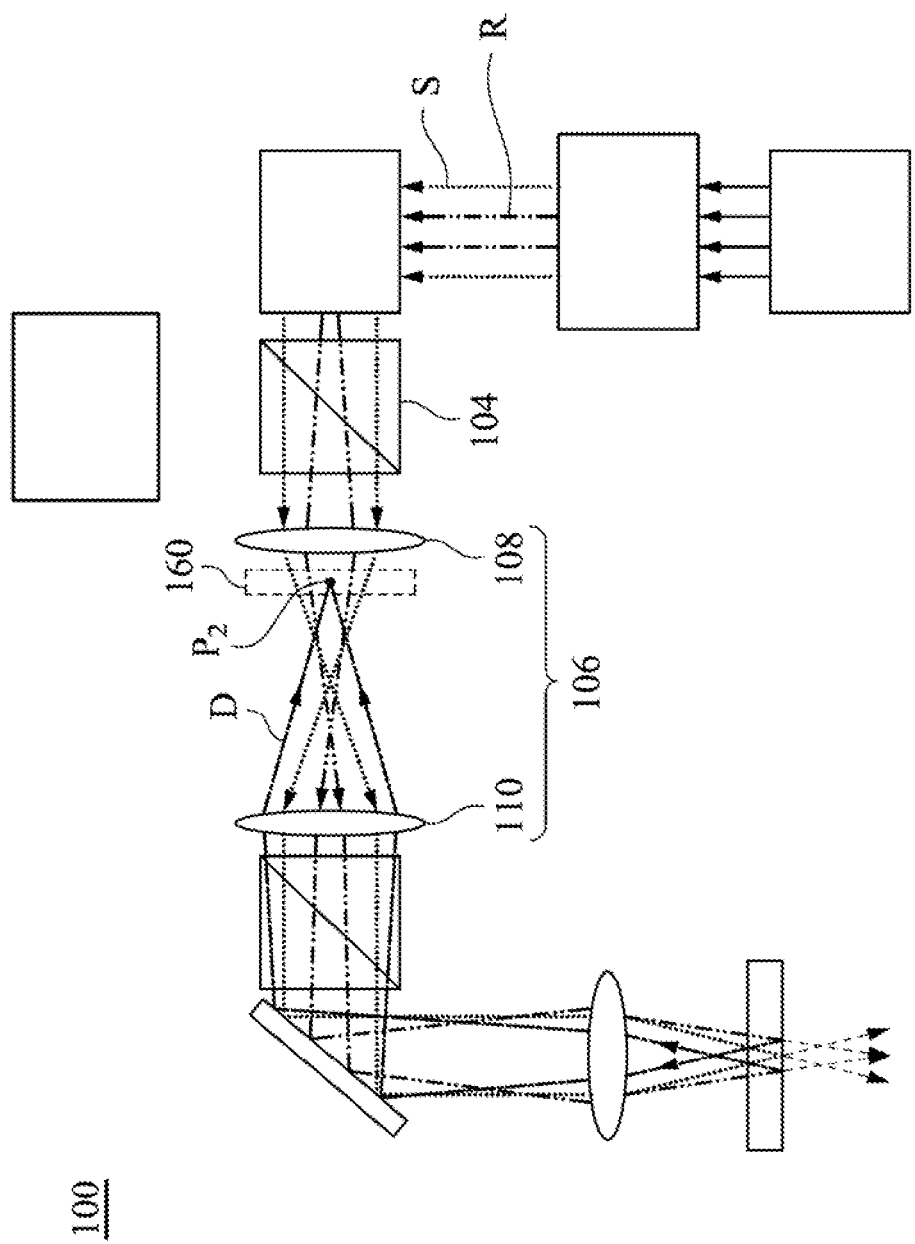
FIG. 16 is a schematic diagram of an arrangement of a holographic storage system according to a ninth embodiment of present disclosure.

FIG. 16 is a schematic diagram of an arrangement of a holographic to rage system according to a ninth embodiment of present disclosure. The difference between the present embodiment and the eighth embodiment is that the disposition of the optical filter 160 corresponds to the lens system 106.

In the present embodiment, the lens system 106 includes a first lens 108 and a second lens 110, in which the signal light beam S and the reference light beam R propagated from the light-splitting unit 104 pass through the first lens 108 and the second lens 110 in sequence.

In the present embodiment, the reference light beam R provided by the holographic>storage system 100 is a diverging spherical wave. Under this configuration, the noise light beam D is focused on a point at a position $P_2$ between the first lens 108 and the second lens 110. Therefore, the optical filter 160 is disposed at the position $P_2$. That is, the optical filter 160 is disposed between the first lens 108 and the second lens 110. Similarly, the polarizer 162 (see FIG. 15A and FIG. 15B) of the optical filter 160 faces toward the light-splitting unit 104. Thus, the polarizer 162 faces toward the first lens 108, and the third quarter-wavelength plate 149 faces toward the second lens 110. Therefore, when the noise light beam D returns the holographic storage system 100 and travels from the second lens 110 toward the first lens 108, the noise light beam D can be blocked, such that the noise in the loading operation is reduced.

In sum, the holographic storage system of the present disclosure includes the holographic light-emitting module, in which the holographic light-emitting module includes the light source module and the light shape, control module. The light source module is configured to provide the signal light beam and the reference light beam. The light shape control module is configured to separate and modulate the signal light beam and the reference light beam. Therefore, the arrangement of the signal light beam and the reference light beam provided by the holographic light-emitting module is that the reference light beam is surrounded by the signal light beam, and the signal light beam and the reference light beam have approximately the same energy. Moreover, during the loading operation, the holographic storage system can switch most of power to the reference light beam, such that the loading operation can be more accurate. Furthermore, the holographic storage system provides the reference light beam with the hollow optical-intensity distribution and the active rotator connected to the second light-guiding module, such that the displacement sensitivity of the holographic storage system can be adjusted. In addition, the holographic storage system includes the optical filter configured to block the noise light beam, thereby reducing the affection caused by the noise light beam in the loading operation of the holographic storage system.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of present disclosure provided they fall within the scope of the following claims.

What is claimed is:

1. A holographic light-emitting module, comprising:
   a light source module configured to provide a signal light beam and a reference light beam, wherein a polarization of the signal light beam is orthogonal to a polarization of the reference light beam; and
   a light shape control module configured to receive the signal light beam and the reference light beam propagated from the light source module, wherein the signal light beam and the reference light beam are modulated and emitted by the light shape control module, and the signal light beam and the reference light beam are partially overlapped, wherein the light shape control module comprises:
      a light-splitting module configured to receive the signal light beam and the reference light beam propagated from the light source module, and to guide and emit the signal light beam and the reference light beam;
      a first light-guiding module configured to receive the signal light beam propagated from the light-splitting module and to guide the signal light beam back to the light-splitting module;
      a second light-guiding module configured to receive the reference light beam propagated from the light-splitting module and to guide the reference light beam back to the light-splitting module, wherein the signal light beam and the reference light beam guided back to the light-splitting module are propagated toward the same direction from a side of the light-splitting module;
      a half-wavelength plate disposed at the side of the light-splitting module and in an optical path of the reference light baem, thereby enabling the signal light beam and the reference light beam passing through the half-wavelength plate to have the same polarization;
      a first light-blocking component disposed in an optical path of the signal light beam and configured to block a portion of the signal light beam, thereby enabling the signal light beam passing through the first light-blocking component to be a hollow light beam; and
      a light-converging module disposed in the optical path of the reference light beam and configured to converge the reference light beam, wherein a cross-sectional area of the converged reference light beam corresponds to a cross-sectional area of the hollow area of the signal light beam, thereby enabling the reference light beam to be surrounded by the signal light beam.

2. The holographic light-emitting module of claim 1, wherein each of the first light-guiding module and the second light-guiding module comprises a mirror, and the light-splitting module comprises:
   a first polarizing beam splitter configured to receive the signal light beam and the reference light beam propagated from the light source module, wherein the signal light beam passing through the first polarizing beam splitter is propagated toward the mirror of the first light-guiding module, and the reference light beam reflected from the first polarizing beam splitter is propagated toward the mirror of the second light-guiding module; and
   a second polarizing beam splitter configured to receive the signal light beam and the reference light beam reflected from the mirror of the first light-guiding module and the mirror of the second light-guiding module respectively, wherein the signal light beam passes through the second polarizing beam splitter, and the reference light beam is reflected from the second polarizing beam splitter,
   wherein the first light-blocking component is disposed between the first polarizing beam splitter and the first light-guiding module, and the light-converging module is disposed between the first polarizing beam splitter and the second polarizing beam splitter.

3. The holographic light-emitting module of claim 2, wherein the light-converging module comprises a long-focal-length lens and a short-focal-length lens, wherein one of the long-focal-length lens and the short-focal-length lens is disposed between the first polarizing beam splitter and the mirror of the second light-guiding module, and the other of the long-focal-length lens and the short-focal-length lens is disposed between the mirror of the second light-guiding module and the second polarizing beam splitter.

4. The holographic light-emitting module of claim 2, wherein the light-converging module comprises at least one cylindrical lens.

5. The holographic light-emitting module of claim 4, wherein the number of the cylindrical lenses is two, and focusing directions of the two cylindrical lenses are orthogonal to each other.

6. The holographic light-emitting module of claim 1, wherein the light-splitting module comprises a first polarizing beam splitter configured to receive the signal light beam and the reference light beam propagated from the light source module, wherein the signal light beam passes through the first polarizing beam splitter, and the reference light beam is reflected from the first polarizing beam splitter, and the first light-guiding module comprises:
   a mirror configured to reflect the signal light beam passing through the first polarizing beam splitter back to the first polarizing beam splitter; and
   a first quarter-wavelength plate disposed between the mirror and the first polarizing beam splitter.

7. The holographic light-emitting module of claim 6, wherein the first light-blocking component is disposed between the mirror and the first quarter-wavelength plate.

8. The holographic light-emitting module of claim 6, wherein the first light-blocking component is disposed between the light source module and the light-splitting module.

9. The holographic, light-emitting module of claim 6, wherein the light-converging module comprises a converging lens disposed between the first polarizing beam splitter and the half-wavelength plate.

10. The holographic light-emitting module of claim 6, wherein the second light-guiding module comprises:
    a curved mirror configured to reflect the reference light beam reflected from the first polarizing beam splitter back to the first polarizing beam splitter; and
    a second quarter-wavelength plate disposed between the curved mirror and the first polarizing beam splitter.

11. The holographic light-emitting module of claim 10, further comprising;
    a second light-blocking component disposed between the curved mirror and the second quarter-wavelength plate.

12. The holographic light-emitting module of claim 10, wherein the curved mirror has different focusing positions in a vertical direction and a horizontal direction.

13. The holographic light-emitting module of claim 6, wherein the second light-guiding module comprises:
   a flat mirror configured to reflect the reference light beam reflected from the first polarizing beam splitter back to the first polarizing beam splitter;
   a focusing lens disposed between the flat mirror and the first polarizing beam splitter for converging the reference light beam, wherein the focusing lens has different focusing positions in a vertical direction and a horizontal direction; and
   a second quarter-wavelength plate disposed between the flat mirror and the first polarizing beam splitter.

14. holographic light-emitting module of claim 1, wherein the light shape control module further comprises an active rotator connected to the second light-guiding module and configured to adjust an incident angle of the reference light beam guided back to the light-splitting module.

15. A holographic light-emitting module, comprising:
   a light source module configured to provide a signal light beam and a reference light beam, wherein a polarization of the signal light beam is orthogonal to a polarization of the reference light beam, and the signal light beam and the reference light beam provided by the light source module have the same light-intensity with a hollow distribution; and
   a light shape control module configured to receive the signal light beam and the reference light beam propagated from the light source module, wherein the signal light beam and the reference light beam are modulated and emitted by the light shape control module, the reference light beam is surrounded by the signal light beam and located at a center of the signal light beam, and the signal light beam and the reference light beam are partially overlapped.

16. A holographic storage system, comprising:
   the holographic light-emitting module of claim 1;
   a spatial light modulator (SLM) configured to receive the signal light beam and the reference light beam provided by the holographic light-emitting module;
   a light-splitting unit;
   a lens system;
   a dichroic beam splitter;
   an object lens, wherein the spatial light modulator emits the signal light beam and the reference light beam toward the light-splitting unit, and the signal light beam and the reference light beam propagated from the light-splitting unit and through the lens system, the dichroic beam splitter, and the object lens in sequence are emitted toward a disk; and
   an optical filter disposed at a corresponding position between the light-splitting unit and the object lens in an optical path of the reference light beam, the optical filter comprising:
   a polarizer configured to allow the reference light beam provided by the light-splitting unit to pass therethrough; and
   a third quarter-wavelength plate disposed on the polarizer, wherein the polarizer faces toward a corresponding side of the light-splitting unit in the optical path of the reference light beam.

17. The holographic storage system of claim 16, There n the optical filter disposed between the dichroic beam splitter and the object lens.

18. The holographic storage system of claim 16, wherein the lens system comprises a first lens and a second lens, wherein the signal light beam and the reference light beam propagated from the light-splitting unit pass through the first lens and the second lens in sequence, and the optical filter is disposed between the first lens and the second lens.

19. The holographic storage system of claim 16, wherein when a position of the disk is written by the holographic storage system, the reference light beam provided by the spatial light modulator has a plurality of polarizations, wherein the polarizations of the reference light beam are orthogonal to each other.

20. The holographic light-emitting module of claim 1, wherein the reference light beam is surrounded by the signal light beam and located at a center of the signal light beam.

* * * * *